United States Patent
Nishibayashi et al.

(10) Patent No.: US 9,385,528 B2
(45) Date of Patent: Jul. 5, 2016

(54) POWER ELECTRONICS DEVICE, COOPERATIVE CONTROL METHOD, COOPERATIVE CONTROL SYSTEM AND COMPUTER READABLE MEDIUM

(71) Applicant: KABUSHIKI KAISHA TOSHIBA, Tokyo (JP)

(72) Inventors: Yasuyuki Nishibayashi, Kawasaki (JP); Kotaro Ise, Kawasaki (JP); Keiichi Teramoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 556 days.

(21) Appl. No.: 13/835,474

(22) Filed: Mar. 15, 2013

(65) Prior Publication Data

US 2014/0077596 A1  Mar. 20, 2014

(30) Foreign Application Priority Data

Sep. 18, 2012 (JP) ................. 2012-204398

(51) Int. Cl.
*H02J 1/00* (2006.01)
*H02J 3/32* (2006.01)
(Continued)

(52) U.S. Cl.
CPC ... *H02J 1/00* (2013.01); *H02J 3/32* (2013.01); *H02J 3/38* (2013.01); *H02J 3/386* (2013.01); *H02J 13/0062* (2013.01); *Y02B 70/3216* (2013.01); *Y02E 10/763* (2013.01);
(Continued)

(58) Field of Classification Search
CPC ........................................ H02J 1/00
USPC .......................................... 307/29
See application file for complete search history.

(56) References Cited

U.S. PATENT DOCUMENTS 8,058,836 B2    11/2011  Ichikawa et al.
2007/0114954 A1*  5/2007  Hampo et al. ................ 318/105
(Continued)

FOREIGN PATENT DOCUMENTS

JP    2003-235252    8/2003
JP    2003-348851    12/2003
(Continued)

OTHER PUBLICATIONS

Office Action dated Sep. 24, 2014 in counterpart JP Application No. 2012-204398 and English-language translation thereof.
(Continued)

*Primary Examiner* — Rexford Barnie
*Assistant Examiner* — Daniel Kessie
(74) *Attorney, Agent, or Firm* — Nixon & Vanderhye, P.C.

(57) ABSTRACT

There is provided a power electronics device including: a first connection unit, a second connection unit, a power conversion unit and a control unit. The first connection unit and the second connection unit are connected to a first power line and a second power line of plural power lines. The power conversion unit converts power from one of the first and second connection units outputs converted power from the other of the first and second connection units. The control unit selects a master device from power electronics devices connected to a third power line that is one of the power lines including the first power line and the second power line, based on power conversion characteristic information of the power electronics devices. The master device controls other power electronics devices except the master device out of the power electronics devices, regarding output of power to the third power line.

11 Claims, 24 Drawing Sheets

(51) Int. Cl.
*H02J 3/38* (2006.01)
*H02J 13/00* (2006.01)

(52) U.S. Cl.
CPC .............. *Y02E 40/72* (2013.01); *Y02E 60/722* (2013.01); *Y02E 60/7838* (2013.01); *Y02E 70/30* (2013.01); *Y04S 10/12* (2013.01); *Y04S 10/123* (2013.01); *Y04S 10/14* (2013.01); *Y04S 20/221* (2013.01); *Y04S 40/124* (2013.01); *Y10T 307/391* (2015.04)

(56) References Cited

U.S. PATENT DOCUMENTS

2010/0283325 A1* 11/2010 Marcianesi et al. ............ 307/82
2011/0133556 A1* 6/2011 Choi ............................... 307/65
2011/0140649 A1* 6/2011 Choi ............................. 320/101
2013/0033111 A1* 2/2013 Kawamoto et al. ............. 307/66

FOREIGN PATENT DOCUMENTS

| JP | 2008-035665 | 2/2008 |
| JP | 2009-118670 | 5/2009 |
| JP | 2010-213482 | 9/2010 |

OTHER PUBLICATIONS

Nguyen, P.H. et al., "Smart Power Router: A Flexible Agent-Based Converter Interface in Acive Distribution Networks", IEEE Transactions on Smart Grid, vol. 2, No. 3, (Sep. 2011), pp. 487-495.

* cited by examiner

2: POWER CHARACTERISTIC INFORMATION
(BASIC INFORMATION TO DETERMINE PARENT)
1: HIERARCHICAL STRUCTURE INFORMATION
(MASTER/SLAVE INFORMATION)
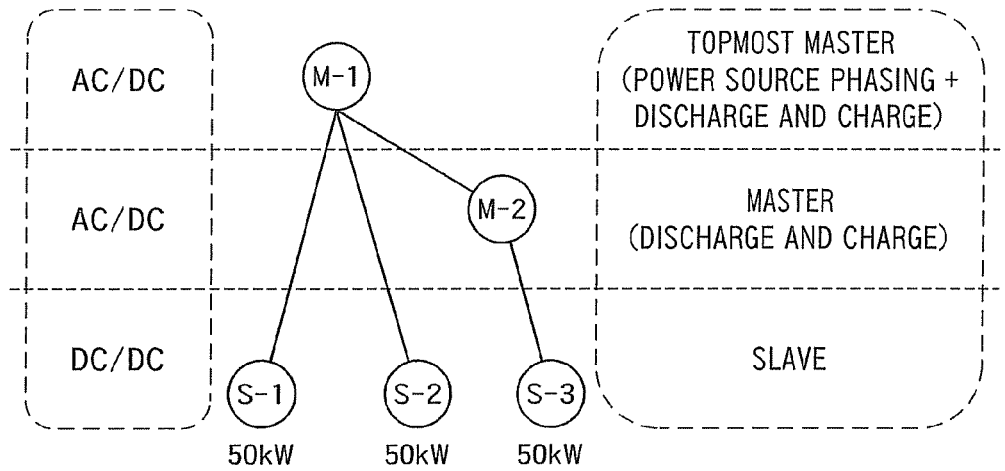
3: OPERATION PLAN INFORMATION
(CHARGE/DISCHARGE PLAN INFORMATION OF POWER ELECTRONICS DEVICE)
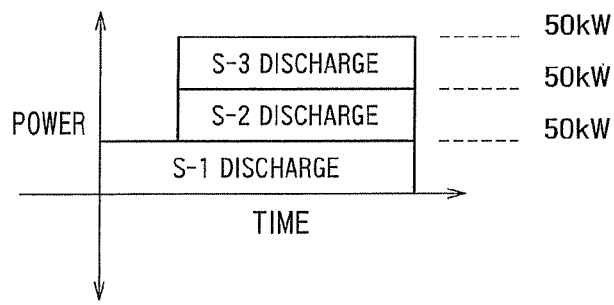
FIG. 6

| | OUTLINE |
|---|---|
| DEVICE ID | IDENTIFIER UNIQUE TO DEVICE |
| DEVICE TYPE | AC/AC, AC/DC, DC/DC |
| CONNECTION INFORMATION WITH RESPECT TO POWER | CONNECTION DEVICE ID, DIRECT/INDIRECT |
| CONNECTION INFORMATION WITH RESPECT TO COMMUNICATION | CONNECTION DEVICE ID, DIRECT/INDIRECT |
| MASTER DEVICE ID | MASTER DEVICE INFORMATION IN VIEW OF DEVICE ID IN STRUCTURE FILE |
| SLAVE DEVICE ID | SLAVE DEVICE INFORMATION IN VIEW OF DEVICE ID IN STRUCTURE FILE |

FIG. 8

| EXAMPLES OF SETTING (CONTROL) INFORMATION EXCHANGED BETWEEN LOCAL CONTROLLER AND POWER ELECTRONICS DEVICE OR BETWEEN POWER ELECTRONICS DEVICE AND POWER ELECTRONICS DEVICE | |
|---|---|
| CONNECTION STATE | INFORMATION AS TO WHETHER POWER ELECTRONICS DEVICE IS CONNECTED TO ECP (ELECTRICAL CONNECTION POINT) |
| AVAILABLE STATE OF PV OUTPUT | INFORMATION AS TO WHETHER PV IS CONNECTED TO POWER ELECTRONICS DEVICE |
| AVAILABLE STATE OF STORAGE BATTERY OUTPUT | INFORMATION AS TO WHETHER STORAGE BATTERY IS CONNECTED TO POWER ELECTRONICS DEVICE |
| AVAILABLE STATE OF ACTIVE-POWER/REACTIVE-POWER CONTROL | INFORMATION AS TO WHETHER ACTIVE-POWER/REACTIVE-POWER CONTROL IS AVAILABLE |
| STATE OF POWER ELECTRONICS DEVICE | OPERATION STATE (DURING OPERATION, INOPERABLE OR STANDBY) OF POWER ELECTRONICS DEVICE |
| LOCAL/REMOTE CONTROL STATE | INFORMATION AS TO WHETHER POWER ELECTRONICS DEVICE OPERATES ALONE OR IT IS CONTROLLED BY LOCAL CONTROLLER |
| INPUT POWER IN POWER ELECTRONICS DEVICE | INFORMATION TO DEVICE INPUT POWER VALUE AND POWER EFFICIENCY OF POWER ELECTRONICS DEVICE |
| TARGET VALUE OF ACTIVE POWER | TARGET VALUE (UNIT: W) OF ACTIVE POWER SET ON POWER ELECTRONICS DEVICE |
| TARGET VALUE OF REACTIVE POWER | TARGET VALUE (UNIT: VAR) OF REACTIVE POWER SET ON POWER ELECTRONICS DEVICE |
| TARGET VALUE OF POWER FACTOR | TARGET VALUE OF POWER FACTOR SET ON POWER ELECTRONICS DEVICE |
| OUTPUT LEVEL VALUE OF ACTIVE POWER | OUTPUT LEVEL VALUE (UNIT: %) OF ACTIVE POWER SET ON POWER ELECTRONICS DEVICE |
| OUTPUT LEVEL VALUE OF REACTIVE POWER | OUTPUT LEVEL VALUE (UNIT: %) OF REACTIVE POWER SET ON POWER ELECTRONICS DEVICE |
| EXAMPLES OF MEASUREMENT INFORMATION EXCHANGED BETWEEN LOCAL CONTROLLER AND POWER ELECTRONICS DEVICE OR BETWEEN POWER ELECTRONICS DEVICE AND POWER ELECTRONICS DEVICE | |
| CURRENT VALUE OF ACTIVE POWER | CURRENT VALUE OF ACTIVE POWER AND UPPER AND LOWER LIMIT VALUES (UNIT: W) |
| CURRENT VALUE OF REACTIVE POWER | CURRENT VALUE OF REACTIVE POWER AND UPPER AND LOWER LIMIT VALUES (UNIT: VAR) |
| UNIT VOLTAGE PER PHASE | UNIT VOLTAGE PER PHASE AND UPPER AND LOWER LIMIT VALUES |
| CURRENT VALUE OF POWER FACTOR | CURRENT VALUE OF POWER FACTOR AND UPPER AND LOWER LIMIT VALUES |

FIG. 14

| EXAMPLE OF MEASUREMENT INFORMATION OF STORAGE BATTERY CONNECTED TO POWER ELECTRONICS DEVICE | |
|---|---|
| RATED CAPACITY | RATED CAPACITY OF STORAGE BATTERY (UNIT: WH) |
| SOC (State of Charge) | CHARGING RATE OF STORAGE BATTERY (UNIT: %) |
| AVAILABLE ELECTRIC ENERGY | SOC X (RATED AMOUNT-RESERVED CAPACITY) |
| MAXIMUM CHARGE RATE | MAXIMUM CHARGE POWER PER UNIT TIME (UNIT: W) |
| MAXIMUM DISCHARGE RATE | MAXIMUM DISCHARGE POWER PER UNIT TIME (UNIT: W) |
| STORAGE BATTERY INTERNAL VOLTAGE | STORAGE BATTERY INTERNAL VOLTAGE (UNIT: V) |
| EXAMPLES OF FIXED INFORMATION EXCHANGED BETWEEN LOCAL CONTROLLER AND POWER ELECTRONICS DEVICE OR BETWEEN POWER ELECTRONICS DEVICE AND POWER ELECTRONICS DEVICE | |
| MANUFACTURE INFORMATION | CHARACTER STRING |
| MODEL INFORMATION | CHARACTER STRING |
| SERIAL NUMBER | CHARACTER TRING |
| RATED ACTIVE POWER | RATED ACTIVE POWER OF POWER ELECTRONICS DEVICE (UNIT: W) |
| RATED APPARENT POWER | RATED APPARENT POWER OF POWER ELECTRONICS DEVICE (UNIT: VA) |
| RATED REACTIVE POWER | RATED REACTIVE POWER OF POWER ELECTRONICS DEVICE (UNIT: VAR) |
| MAXIMUM CHARGE RATE | MAXIMUM CHARGE POWER PER UNIT (UNIT: W) |
| MAXIMUM DISCHARGE RATE | MAXIMUM DISCHARGE POWER PER UNIT TIME (UNIT: W) |
| SOURCE INFORMATION OF TIME SYNCHRONIZATION | CHARACTER STRING |

FIG. 15

| DEVICE TYPE BETWEEN POWER ELECTRONICS DEVICES | MAIN APPLIED APPLICATION | MASTER DETERMINATION METHOD |
|---|---|---|
| AC/DC↔AC/DC | POWER SOURCE PHASING | ·DETERMINE POWER ELECTRONICS DEVICE ACTIVATED FIRST AS MASTER<br>·DETERMINE POWER ELECTRONICS DEVICE HAVING CONNECTION TO HIGHER EMS AS MASTER<br>·SLAVE NUMBER OR TOTAL SLAVE AMOUNT VALUE |
| AC/DC↔DC/DC | POWER DISTRIBUTION | ·DETERMINE POWER ELECTRONICS DEVICE ON AC/DC SIDE AS MASTER |
| DC/DC↔DC/DC | POWER DISTRIBUTION | ·DETERMINE POWER ELECTRONICS DEVICE ACTIVATED FIRST AS MASTER<br>·DETERMINE POWER ELECTRONICS DEVICE HAVING CONNECTION TO HIGHER EMS AS MASTER |
| AC/AC↔AC/DC<br>AC/AC↔AC/AC<br>AC/AC↔DC/DC | — | — |

FIG. 22

STRUCTURE FILE INFORMATION

| COMMUNICATION HEAD | DEVICE ID | DEVICE TYPE | CONNECTION INFORMATION WITH RESPECT TO POWER | CONNECTION INFORMATION WITH RESPECT TO COMMUNICATION | MASTER DEVICE ID | SLAVE DEVICE ID |
|---|---|---|---|---|---|---|

FIG. 25

POWER ELECTRONICS DEVICE, COOPERATIVE CONTROL METHOD, COOPERATIVE CONTROL SYSTEM AND COMPUTER READABLE MEDIUM

CROSS REFERENCE TO RELATED APPLICATIONS

This application is based upon and claims the benefit of priority from the prior Japanese Patent Application No. 2012-204398 filed on Sep. 18, 2012, the entire contents of which are incorporated herein by reference.

FIELD

Embodiments described herein relates to a power electronics device, a cooperative control method, a cooperative control system and a computer readable medium.

BACKGROUND

Take a moment to consider a system in which inverter units (i.e. power electronics devices) are provided with a communication function and autonomous cooperative control is applied between the power electronics devices to provide the flexibility of installation locations for the power electronics devices while enabling a capacity increase of fully-automatic at the time of expansion and maintenance of a power electronics device.

At this time, for example, in a case where multiple power electronics devices are activated in parallel to increase an output of power, it is necessary to consider a power source phasing function. An object of the power source phasing is to prevent an occurrence of cross current (e.g. reactive current caused by a difference of electromotive force, synchronization cross current caused by a phase difference of electromotive force and harmonic cross current caused by a waveform difference of electromotive force) in an output on the alternating-current side. In this case, however, it is essential to determine the subject of control, namely a master device (or simply "master") in the multiple power electronics devices. A power electronics device controlled by the master corresponds to a slave device (or simply "slave").

In the related art, there is disclosed a method of operating multiple power electronics devices in parallel by optical communication and implementing a power source phasing without using a current-limiting reactor. Also, there is disclosed a method of dynamically coping with power distribution between the multiple power electronics devices.

However, when multiple power electronics devices are installed and operated, a problem is that manual management becomes complicated as the scale increases. For example, regarding determination of a master/slave relationship between multiple power electronics devices, it is presumably applied to a small number of units in the related art. As in a massive power source phasing function, in order to activate multiple power electronics devices as master candidates in parallel, it is necessary to determine a master/slave relationship in multiple layers. Although a structure between units varies depending on the use (e.g. power distribution or power source phasing) of power electronics devices, a supposition is fixed in the related art.

As described above, the related art does not solve a problem of manual management becoming complicated as the scale increases when multiple power electronics devices are installed and operated. Also, although a structure between units varies every use of power electronics devices, the supposition in the related art provides a framework of fixed setting.

BRIEF DESCRIPTION OF THE DRAWINGS

FIG. 6 is a view illustrating an example of hierarchical structure information, power conversion characteristic information and operation plan information according to the first embodiment;

FIG. 8 is a view illustrating a structure file information example of a power electronics device according to the first embodiment;

FIG. 14 is a view illustrating an example of information exchanged between units according to the first embodiment;

FIG. 15 is a view illustrating an example of information exchanged between units according to the first embodiment;

FIG. 22 is a view illustrating priority criteria for master determination according to the second embodiment;

FIG. 25 is a view illustrating a communication message structure related to a structure file according to the second embodiment.

DETAILED DESCRIPTION

According to one embodiment, there is provided a power electronics device including: a first connection unit, a second connection unit, a power conversion unit and a control unit.

The first connection unit is connected to a first power line that is one of a plurality of power lines.

The second connection unit is connected to a second power line that is another one of the plurality of power lines.

The power conversion unit converts power input from one of the first connection unit and the second connection unit and outputs converted power from the other of the first connection unit and the second connection unit.

The control unit selects a master device from power electronics devices connected to a third power line that is one of the power lines including the first power line and the second power line, based on power conversion characteristic information of the power electronics devices. The master device controls other power electronics devices except the master device out of the power electronics devices, regarding output of power to the third power line.

Hereinafter, embodiments will now be explained with reference to the drawings.

First Embodiment

Figure 1:
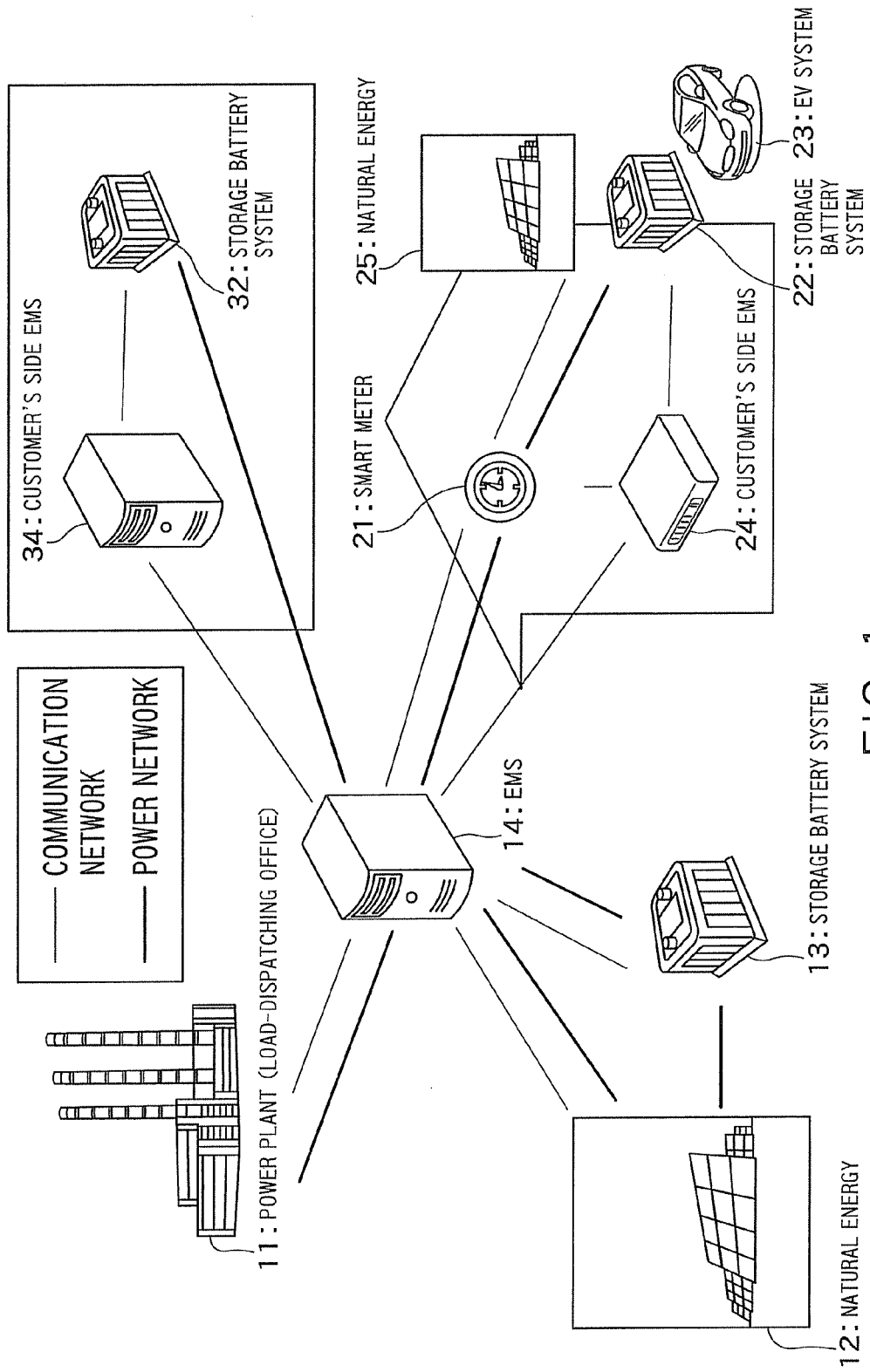
FIG. 1 is an overall system structure view according to the first embodiment.

FIG. 1 presents a system structure according to an embodiment. On a power system network, there are provided a power plant (or load-dispatching office) 11, a natural energy device 12, a storage battery system 13 and an EMS (Energy Management System) 14. Also, on the side of customers such as a home or building, there are provided a smart meter 21, storage battery systems 22 and 32, an EV (Electric Vehicle) system 23 and customer's side EMS's 24 and 34. The EMS 24 on the home customer side is referred to as "HEMS (Home Energy Management System)" and the EMS 34 on the building customer side is referred to as "BEMS (Building Energy Management System)," which manage the energy amount on premises. Also, a natural energy device 25 and the storage battery systems 22 and 32 are connected to inverters (i.e. power electronics devices) that convert the direct current and the alternating current.

The power plant (or load-dispatching office) 11 generates a large amount of power by fuel sources such as thermal power and nuclear power, and supplies it to the side of customers such as homes, buildings and factories through transmission and distribution networks. In the present specification, the transmission and distribution networks from the power plant 11 to the customers are collectively referred to as "power system network."

The natural energy device 12 generates power from energy existing in the natural world such as wind power and sunlight, and, in the same way as the power plant, supplies the power from the power system network to the customers through transmission and distribution networks. By installing the natural energy device 12 in the power system network, it is possible to reduce the burden in the power plant and efficiently perform an operation.

Here, the storage battery system 13 has a role to store surplus power generated in the power plant 11 and the natural energy device 12.

Also, the EMS 14 has a role to perform control of stabilizing the whole power system including supply power of the power plant 11 and the natural energy device 12 and load power consumed on the customer side, using both a power network and a communication network.

The smart meter 21 measures the electric energy consumed on the customer side premise and periodically reports it to a management server of an electric power provider. Generally, although the management server is referred to as "MDMS (Metering Data Management System)," its illustration is omitted in FIG. 1. The EMS 14 can calculate the total amount of load power on the customer side in cooperation with the MDMS.

The storage battery system 22 installed in a customer's premise stores power supplied from the system network of the electric power provider or the natural energy device 25 on the premise. The EV system 23 stores power in an in-vehicle battery through a battery charger.

The HEMS performs adjustment control of the power consumption amount in the home and the BEMS performs adjustment control of the power consumption amount in the building or factory. As described above, the embodiment are applicable to not only the home but also the building or factory in the same way. In this case, as a substitute for the home HEMS, the BEMS performs adjustment control of the power consumption in the building and an FEMS (Factory Management System) performs adjustment control of the power consumption on the premise.

As the use on the system side of the electric power provider in the storage battery system 13, a storage battery system is utilized to realize a function called "ancillary service" (i.e. short-period control) that stabilizes a system by performing output adjustment on the second time scale according to instantaneous load changes in order to maintain the electrical quality such as system frequency or voltage.

Also, as the use of the storage battery system 22 on the home or building customer side, it may be utilized to realize a function called "peak shift" (i.e. day operation) that stores nighttime power of a lower unit price to implement interchange in a time zone in which the diurnal power use is peak.

Here, the power electronics device converts power between direct-current power input/output in/from the storage battery or the natural energy device and alternating-current power of the power system network.

Figure 2:
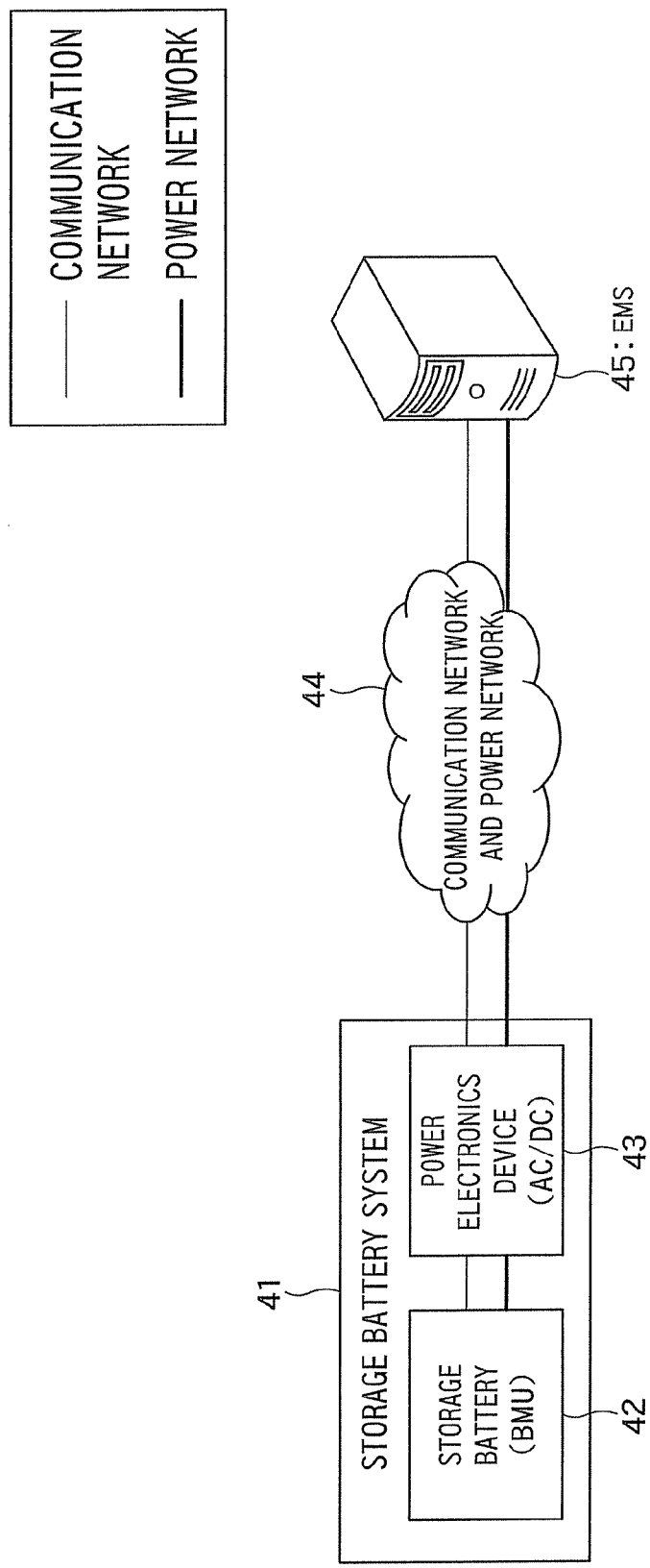
FIG. 2 is a storage battery system structure view according to the first embodiment.
Figure 3:
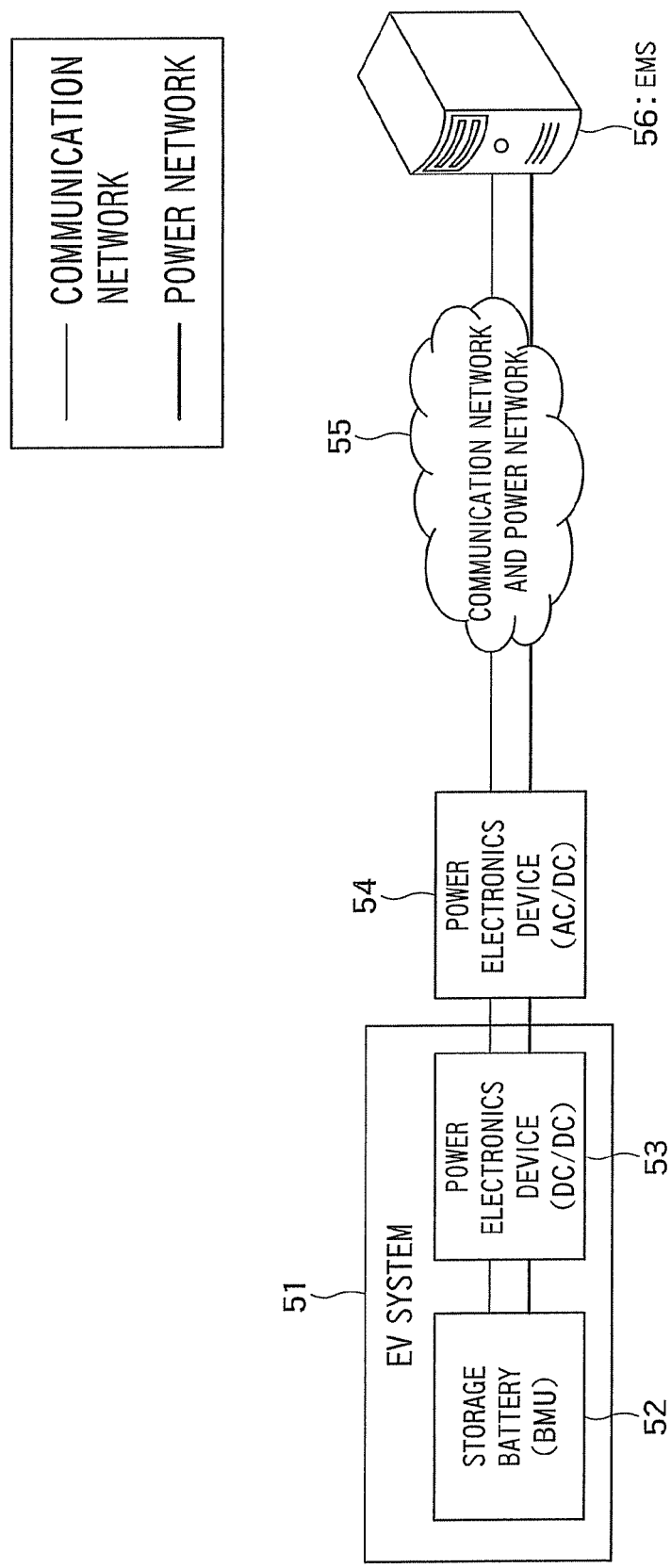
FIG. 3 is an EV system structure view according to the first embodiment.

FIG. 2 and FIG. 3 illustrate basic system structures of a power electronics device according to the first embodiment. These are details of part of the system structure in FIG. 1. FIG. 2 presents a detailed structure of the storage battery system and FIG. 3 presents a derailed structure of the EV system. It is basically assumed that a storage battery system 41 is used in a fixed position and an EV system 51 is used in a vehicle. Alternatively, for example, even if a storage battery 42 in the storage battery system 41 is replaced with a natural energy device such as wind power and solar power generation, the same system is applicable.

The storage battery system 41 in FIG. 2 is formed with a storage battery (BMU: Battery Management Unit) 42 and a power electronics device 43. The storage battery system 41 is connected to each EMS 45 via a communication network and power network 44. The power electronics device 43 is also called "inverter," "converter" or "PCS (Power Conditioning System)" and therefore has a role to convert an input/output of power and adjust the voltage amount. The storage battery (BMU) 42 includes multiple battery cells and an internal processor to manage the state inside a battery pack, and implements charge/discharge control of power based on a request from the power electronics device 43. The storage battery (BMU) 42 reports information such as the rated voltage, the maximum current value at the time of discharge and charge, the SOC (State Of Charge) and the SOH (State Of Health) to the power electronics device 43.

In the example of FIG. 2, the power electronics device 43 exchanges direct-current power with the storage battery 42 and alternating-current power with the power network. Although the power electronics device 43 performs direct-current/alternating-current conversion and voltage change suppression, it is considered that these functions themselves are implemented on a processor connected to the outside of the device.

Also, regarding procedures for the charge/discharge control and the information report between the storage battery (BMU) 42 and the power electronics device 43, in addition to a method of realizing them using a CAN (Controller Area Network), there is a possible method of realizing them using a wire communication medium such as Ethernet or a wireless communication medium such as a wireless LAN (Local Area Network), and, furthermore, an electrical signal line that is uniquely defined by a vendor who sells products. However, the embodiment is not limited to any communication unit.

The power electronics device 43 in the storage battery system 41 in FIG. 2 has a communication function and communicates with each EMS 45 installed in the power system network or the customer's premise. Generally, since a storage battery has a feature of self-discharge, by acquiring information such as SOC and SOH from the storage battery system 41, the EMS 45 can appropriately monitor the state that changes over time and instruct charge/discharge control.

Here, an input/output of power through the power electronics device 43 may be referred to as "discharge and charge." This means that not only the storage battery (BMU) 42 but also natural energy such as wind power and solar power generation and the power exchanged with the power system network are the targets in the embodiment. In an electrical system formed with aggregation of power electronics devices, although the power electronics devices have a role to switch the input/output direction of power, this is explained in detail in FIG. 4 below.

Although the EV system 51 in FIG. 3 employs a structure similar to the storage battery system 41 in FIG. 2, they are different in that a power electronics device 54 operating as a battery charger exists in addition to a power electronics device 53 that is connected to the storage battery 52 and operates. The EV system 51 is connected to each EMS 56 through a communication network and power network 55.

The power electronics device 53 connected to the storage battery 52 in the EV system 51 in FIG. 3 relays power and communication information between the storage battery (BMU) 52 and the power electronics device (i.e. battery charger) 54. In this case, the power electronics device 53 does not necessarily have to have a communication capability to communicate with each EMS on the power system network or a customer's premise. That is, in the example of FIG. 3, there is a feature that an alternating-current/direct-current conversion function in the power electronics device 43 in the storage battery system 41 in FIG. 2 is shifted to the battery charger side corresponding to the power electronics device 54. That is, in the structure in FIG. 3, the power electronics device 53 implements direct-current/alternating-current conversion and the power electronics device 54 implements direct-current/alternating-current conversion. However, a specific procedure to realize the first embodiment is common in FIG. 2 and FIG. 3, and, furthermore, the role of the EV system 51 can be defined to the same role as the storage battery system 41. Further, although there are multiple formats that: algorithm processing related to discharge and charge with respect to the storage battery (BMU) is integrated into the power electronics device 53; the algorithm processing is integrated into the power electronics device (i.e. battery charger) 54; and the algorithm processing is integrated into HEMS/BEMS on a customer's premise or EMS in the power system network, the embodiment can be realized in the same framework even if any configuration is used.

Figure 4:
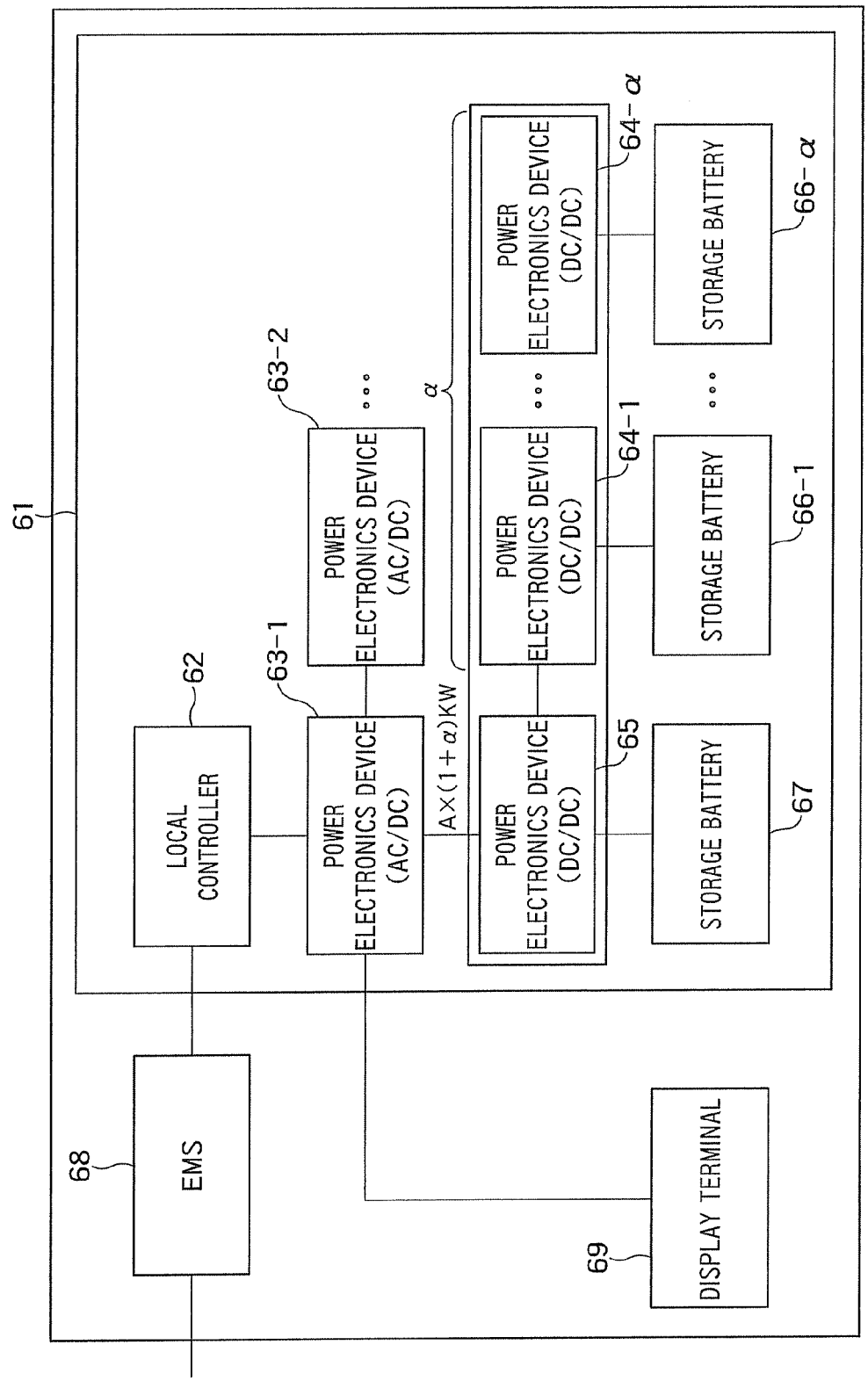
FIG. 4 is a system structure view of multiple power electronics devices according to the first embodiment.

FIG. 4 illustrates a system structure view by multiple power electronics devices according to the first embodiment. Such a system structure can be arranged in any of the power system side and the customer side.

In the case of combining multiple storage batteries (or natural energy devices) and forming aggregation of power units, the aggregation includes one or multiple local controllers, power electronics devices (AC/DC or DC/DC) and storage batteries. In the example in the figure, a local controller 62, power electronics devices (AC/DC or DC/DC) 63-1, 63-2, 65 and 64-1 to 64-α and storage batteries 67 and 66-1 to 66-α are displayed in a power system 61 corresponding to the aggregation. Also, a line connecting element blocks illustrated in FIG. 4 shows a schematic hierarchical structure between the elements, and does not necessarily correspond to an actual power line connection relationship.

In the case of such aggregation 61, communication between each external EMS 68 and the local controller 62 (the local controller itself can be omitted) corresponds to the examples in FIG. 2 and FIG. 3, and realizes a power application such as control of active power or reactive power and control of power distribution. The EMS 68 and the local controller 62 correspond to examples of a higher-order control device. In the case of performing communication in multiple power electronics devices, it is possible to activate the multiple power electronics devices in parallel and realize a power application such as control of a power source phasing for an output increase of power. In the example in FIG. 4, when it is assumed that inputs/outputs of the power electronics devices 65 and 64-1 to 64-α are A kW, by activating 1+α items in parallel, a power input/output of A×(1+α) kW can be intended.

An object of the power source phasing is to prevent an occurrence of cross current (e.g. reactive current caused by a difference of electromotive force, synchronization cross current caused by a phase difference of electromotive force and harmonic cross current caused by a waveform difference of electromotive force) in an output on the alternating-current side. To this end, however, a problem is that correct synchronization is not found unless a control subject to identify a synchronization source device is determined (i.e. master/slave determination) in addition to information communication between power electronics devices operating in parallel.

To be more specific, there is a feature that, for example, in the case of connection to a large power signal such as the power system network, a power electronics device does not especially have to exchange information for synchronization via a communication network and gradually synchronizes with the power network signal by electrical characteristics. However, a problem in a case where the scale of input/output electric energy is substantially constant and multiple items operate at the same time as illustrated in FIG. 4 is that, unless information of a target for synchronization is exchanged via a communication network, a power input/output intended by the user of the power electronics devices is not performed. Also, as illustrated in FIG. 4, by communicatively connecting a power electronics device (i.e. the power electronics device 63-1 in the example in FIG. 4) to a display terminal 69, it is possible to realize a power application for a data monitor, abnormal report or parameter adjustment.

Also, on the power system network side, to respond to an instantaneous load change, each storage battery generally supports a function called "ancillary service." In this case, since it is necessary to secure a large storage capacity equal to a power plant, as illustrated in FIG. 4, it is desirable to install multiple distributed power sources (i.e. storage battery or natural energy device) connected to power electronics devices. Meanwhile, even on the customer side, it is a common practice to provide a function called "peak shift" to store nighttime power of a lower unit price to implement interchange in a time zone in which the diurnal power use is peak. In addition to this, it can be considered to apply an application in which, under a condition to give a certain incentive to the customer side, an electric power provider uses the storage batteries installed on the customer side or power of natural energy. In these uses, regarding the subject of the control right, since power storage and power interchange simultaneously occur in a case where there are multiple users, a system configuration is assumed in which there are multiple control subjects and uncontrolled subjects together.

Figure 5:
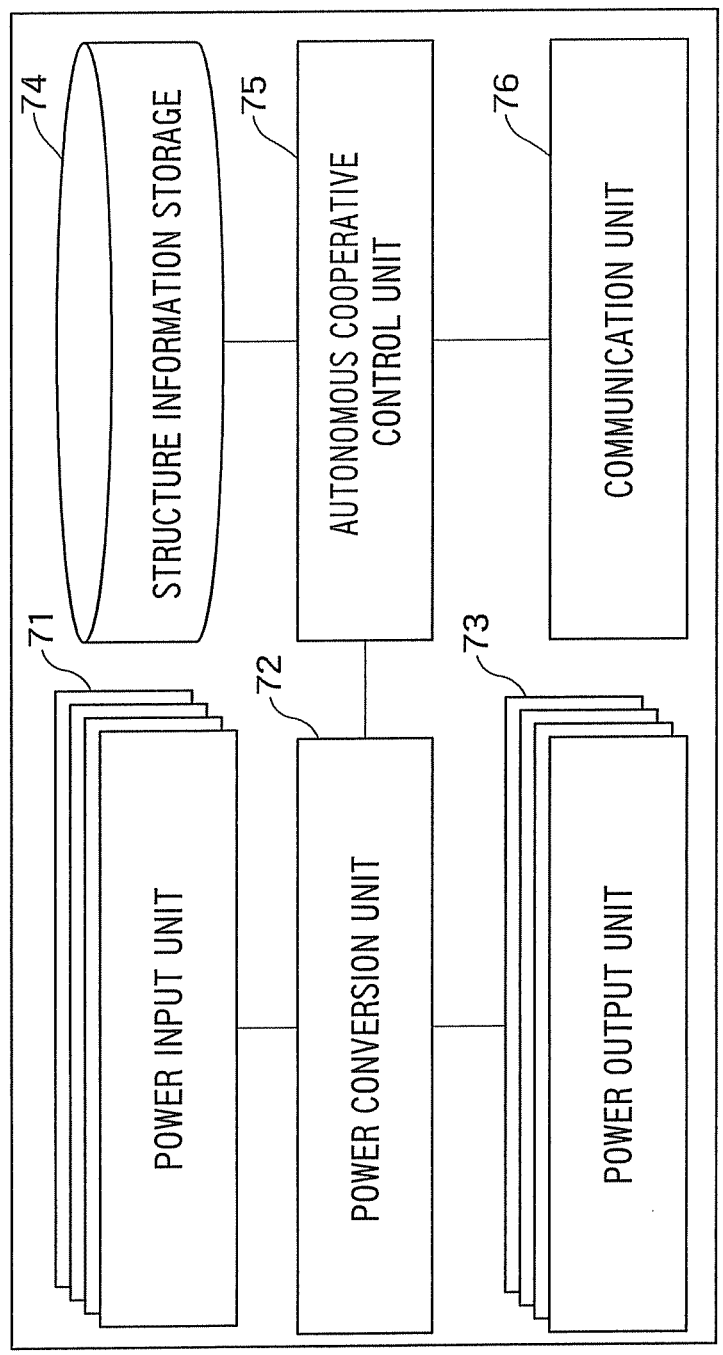
FIG. 5 is a structure view of a power electronics device according to the first embodiment.

FIG. 5 presents a structure example of a power electronics device according to the first embodiment. As described above, the power electronics device corresponds to the power electronics device in the power system in FIG. 4. Alternatively, it corresponds to the power electronics device connected to the storage battery (BMU) in the power battery system in FIG. 2. Alternatively, it corresponds to the power electronics device 53 connected to the storage battery (BMU) in the EV system in FIG. 3 or the power electronics device 54 connected to the battery charger. Further, the embodiment is similarly applicable to the case of connection to a natural energy device such as solar power generation and wind power generation.

In the first embodiment, by causing multiple converters having a communication function to act in an autonomous cooperative manner and determine a master/slave relationship, it is possible to maintain the flexibility of installation locations while automatically increasing the capacity and maintaining the total charge/discharge power throughput amount of distributed power sources at the time of expansion and maintenance. It is needless to say that part or all of components in FIG. 5 are not limited to be applied to a power electronics device but are similarly applicable to an EMS or a local controller and can be implemented. That is, the local controller and the EMS have a power conversion function and these devices can be treated as a power electronics device.

The power electronics device in FIG. 5 is formed with power input units (i.e. power connection units) 71, a power conversion unit 72, power output units (i.e. power connection units) 73, a structure information storage 74, an autonomous cooperative control unit 75 and a communication unit 76. The power input units 71 and the power output units 73 are connected to power lines and connected to other devices (e.g. discharge device such as a power electronics device, controller, EMS, storage battery and natural energy device) via the power lines.

Specifically, the power input units 71, the power conversion unit 72 and the power output units 73 play roles of direct-current/alternating-current, direct-current/direct-current or alternating-current/alternating-current power conversion, frequency monitoring and adjustment of power and change detection and adjustment of voltage. In the example in the figure, although there are multiple power input units 71 and power output units 73, the number of each of them may be one in actual implementation.

In actual implementation, in a case where a power electronics device is connected to a storage battery (BMU), there are two methods that: power from the storage battery (BMU) is input in the power input units 71 via the power lines; and power input from the power lines are output from the power output units 73 to the storage battery (BMU) side via the power lines. Regarding the power input units or the power output units, in addition to a method of preparing each of them as a physical circuit, a method of commonly preparing them in the same circuit is possible. By this means, the power electronics device implements charge/discharge control with respect to the natural energy device or the storage battery (BMU).

Even when any of the electric energy expressed in Wh (Watt hour), the electric energy expressed in Ah (Ampere hour) and the electric energy expressed in Vh (Volt hour) is used as the electric energy at the time of charge/discharge control, the embodiment can be similarly implemented.

In the embodiment, the structure information storage 74 stores three kinds of information of hierarchical structure information, power conversion characteristic information and operation plan information. Other information than these three kinds of information can be used as information stored in the storage 74. Examples of the hierarchical structure information, the power conversion characteristic information and the operation plan information are illustrated in FIG. 6.

Seen from the power electronics device, the hierarchical structure information indicates information of a master (i.e. parent) device and slave device. In the example in FIG. 6, in hierarchical structure information stored in the structure information storage 74 of a power electronics device M-2, a master is expressed as M-1 and a slave is expressed as S-3.

The power conversion characteristic information indicates device types such as alternating-current/alternating-current (AC/AC), alternating-current/direct-current (AC/DC) and direct-current/direct-current (DC/DC), and can be used to determine a master and a slave. In the example in FIG. 6, power conversion characteristic information stored in the structure information storage 74 of the power electronics device M-2 describes "alternating-current/direct-current (AC/DC)," for example.

Here, the power electronics device may have a unique physical device structure per power conversion function or functions may be commonalized. For example, in the case of commonalizing the functions, the power electronics device can perform not only alternating-current/direct-current (AC/DC) conversion but also direct-current/direct-current (DC/DC) conversion. At this time, regarding expression of the power conversion characteristic information, there are a method of describing all possible power conversion functions and a method of performing description in association with a role determined at the time of actually connecting to a power line and inputting/outputting power. In the case of connection to at least one bus line (or device on the bus line) for alternating current and connection to at least one bus line (or device on the bus line) for direct current, power conversion characteristic information of the power electronics device describes alternating-current/direct-current (AC/DC), for example. In the case of only one type of them, it describes alternating-current/alternating-current (AC/AC) or direct-current/direct-current (DC/DC), for example.

The operation plan information denotes plan information related to discharge and charge (i.e. input and output) of power of the storage battery (BMU), natural energy device or power network connected to the power electronics device, which can be expressed in a format in which the horizontal axis indicates the time and the vertical axis indicates the electric energy.

To form the operation plan information, as an example, there is a method of using information unique to charge/discharge control of the storage battery (BMU) or the natural energy device. For example, in the case of a storage battery, there are generally known concepts of rated charge/discharge power expressed in W (Watt), rated capacity expressed in Wh (Watt hour), SOC (State Of Charge) expressed in percentage and dischargeable time and chargeable time associated with the SOC.

In a constant current charge mode which is a general charge mode of the storage battery (BMU), the electric energy (i.e. current amount) input/output by a battery cell in the storage battery (BMU) remains in a constant state until the SOC expressed in percentage reaches a predetermined threshold. In view of this, by acquiring a value of the SOC from the storage battery (BMU), it is possible to calculate the chargeable time and dischargeable time, the maximum charge/discharge power and the electric energy required for discharge and charge (i.e. product of the dischargeable and chargeable time and the power), which are associated with that information. In constant current charge, since there is a feature that the current amount required for charge is minimized after the SOC is over the predetermined threshold, it is possible to find an approximation of information required for a charge/discharge plan. Also, as the electric energy at the time of charge/discharge control, it is possible to use the current amount expressed in Ah (Ampere hour) and the voltage amount expressed in Vh (Volt hour) in addition to the electric energy expressed in Wh (Watt hour).

Also, since it is not possible to store (charge) power in the case of a natural energy device such as solar power generation and wind power generation, the SOC has no concept and operates as a dedicated device for discharge. By contrast, in a case where a device connected to a power electronics device is an accumulator, since it is not possible to discharge power, it is controlled as a dedicated device for charge.

By determination based on the above information in the device itself or other devices, an operation plan of the power electronics device is created by describing specific discharge/charge operations. At the time of real-time control to prevent instantaneous interruption of power supply in a power network, it is desirable to operate by on-demand operation to appropriately transmit/receive a communication message related to a charge/discharge control instruction. Meanwhile, at the time of control at relatively gradual time intervals in the nighttime zone, it is desirable to operate by planned operation to set an operation timing schedule of charge/discharge control. The operation plan information may store specific control content in at least the device, perform a control instruction in real time if necessary and perform a control instruction as schedule information in some time intervals.

The autonomous cooperative control unit 75 in FIG. 5 detects a structure change related to other devices (e.g. attachment/detachment of a device and addition/removal/stop/restart of a device function), updates the hierarchical structure information, the power conversion characteristic information and the operation plan information in the structure information storage 74 and manages an input and output of power. Details are described below. Here, the autonomous cooperative control unit 75 may have a connection check test unit to check a connection relationship with respect to power or communication. For example, a pulse such as voltage is applied from one side of a power bus line and detected on the other side to decide a connection relationship with respect to power. Alternatively, there is provided a configuration in which two power electronics devices perform a connection check and detect a shift to a connection state by some input from the user and thereby decide connection relationships with respect to communication and power. The communication unit 76 in FIG. 5 plays a role of generating information such as hierarchical structure information, power conversion characteristic information and operation plan information as communication messages and transmitting/receiving them through an EMS, local controller, other power electronics devices or communication network. In addition to a case where the communication unit 76 performs processing of transmitting/receiving a communication message, there is a case where it has a first communication unit and a second communication unit as communication media.

For example, the first communication unit is realized by a wireless communication medium such as IEEE802.11, in addition to a wire communication medium such as an optical fiber, telephone line and Ethernet. A communication medium in the present embodiment does not depend on a specific communication medium. The power electronics device acquires communication messages from the EMS, the local controller and other power electronics devices through the first communication unit.

Meanwhile, the second communication unit acquires characteristic information (such as rated capacity, charge/discharge start/end voltage, upper limit temperature, lower limit temperature, maximum charge/discharge current and rated voltage) which is unique information of the storage battery (BMU) or natural energy device connected to the power electronics device, and further acquires measurement information or setting information during operation. In a case where the storage battery (BMU) is connected to the power electronics device, measurement information (such as SOC, SOH, charge/discharge current and charge/discharge voltage) which is variation information at the time of an operation of the storage battery (BMU) is periodically acquired. The second communication unit can be realized by CAN which is a general interface standard of the storage battery (BMU), a communication medium such as Ethernet or an electrical signal line uniquely assumed by a vendor who handles manufacture of a storage battery system, while the first embodiment does not depend on a specific medium.

Also, in a case where the storage battery is connected to the power electronics device, since an internal battery cell generally has a feature of self-discharge, at the time of transmitting information such as SOC and SOH to the EMS, the local controller or other power electronics devices, it is not necessarily completed by only one transmission. Similar to information of voltage or current, it is desirable to timely report it taking into account a feature that the value changes over time.

Also, as described above, it is needless to say that the power electronics device mainly operating as an inverter in the embodiment is not limited to be connected to the storage battery (BMU), can be connected to solar power generation and wind power generation or various EMS's and local controller that communicate with them, and is not restricted by a specific device.

Figure 7:
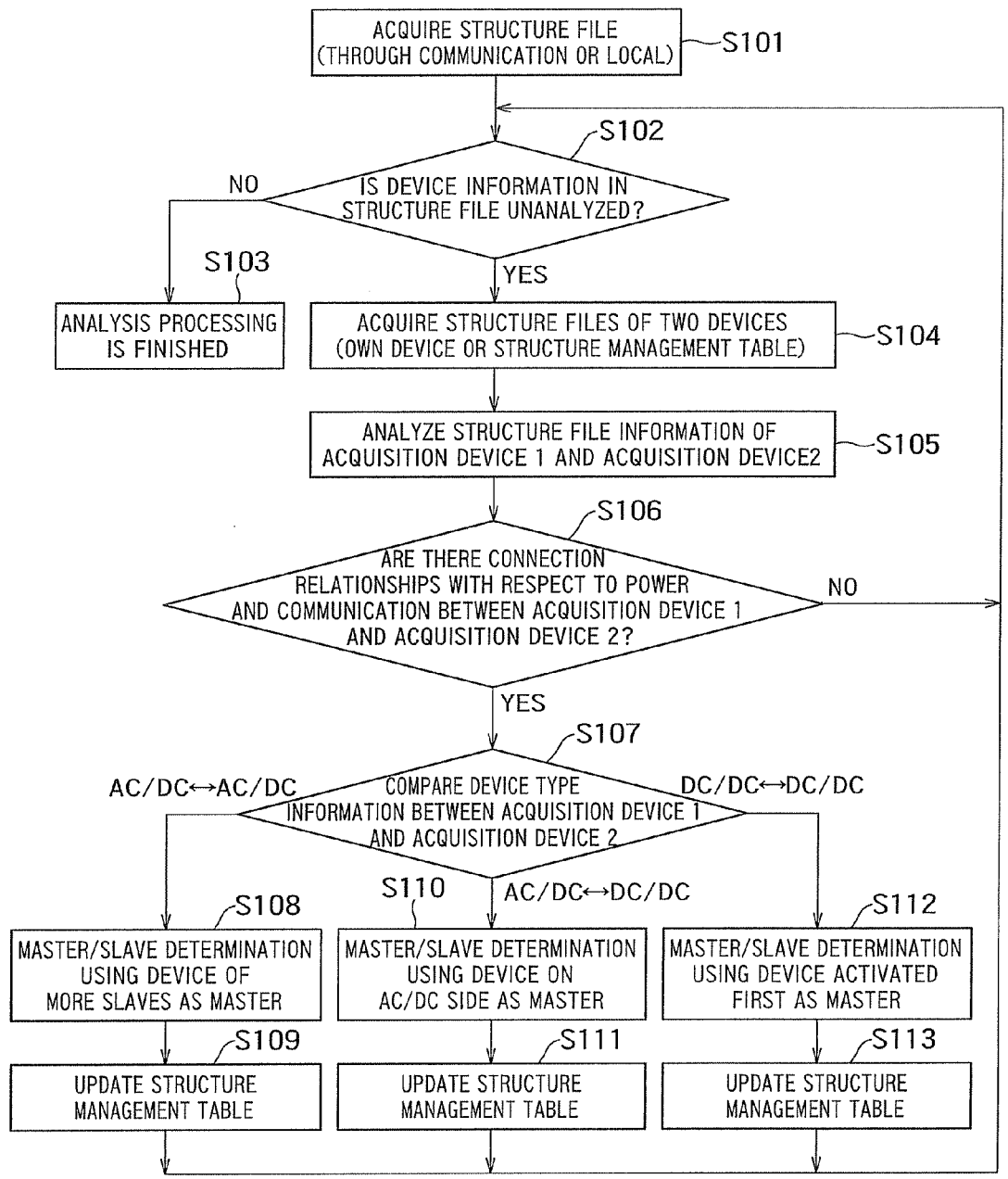
FIG. 7 is a decision flowchart of a power electronics device according to the first embodiment.

FIG. 7 presents an entire operation flowchart related to the first embodiment and the second embodiment described below. Also, FIG. 8 presents content of a structure file treated during an operation of the flowchart in FIG. 7.

The structure file is formed every device (e.g. power electronics device, EMS or local controller) and includes information such as the device ID, the device type, connection information with respect to power, connection information with respect to communication, the master device ID and the slave device ID. These items of information are part of information stored in the structure information storage 74 in the power electronics device illustrated in FIG. 5. The device type in FIG. 8 corresponds to the power conversion characteristic information in FIG. 6 and the master device ID and the slave device ID in FIG. 8 correspond to the hierarchical structure information in FIG. 6.

The device ID denotes personal information unique to the device, which is uniquely identifiable information such as the serial number and the MAC address of a communication adaptor.

The device type corresponds to the power conversion characteristic information in FIG. 6 and indicates information such as alternating-current/alternating-current (AC/AC), alternating-current/direct-current (AC/DC) and direct-current/direct-current (DC/DC). The device type can be used to determine a master or slave.

The master device ID or the slave device ID denotes information of a master device or slave device in view of the device ID in the structure file. In the example in FIG. 5, regarding the power electronics device M-2, M-1 is described as the master device ID and S-3 is described as the slave device ID.

The connection information with respect to power indicates information of a device that is connected to the same power line as the above device and supplies power in a direct or indirect manner.

The connection information with respect to communication indicates information of a device that is connected to the same communication medium (including wireless) as the above device and can exchange (or relay) information in a direct or indirect manner.

The power electronics devices, various EMS's or local controllers according to the embodiment exchange communication messages including part or all of the structure file information in FIG. 8 and determine a master or slave in the hierarchical structure. The operation flowchart in FIG. 7 indicates operations inside the power electronics device at the time of acquiring these items of structure file information.

First, structure information is acquired from a communication network or a local storage area (S101). Next, it is checked whether the acquired structure file information has been analyzed (S102). This step can be omitted. However, in a case where a system formed with multiple power electronics devices is huge, for example, it is preferable that from the standpoint of reducing processing load or giving priority to the latest structure information, information having been analyzed in the past is not targeted for subsequent processing (S103).

Subsequently, in order to perform comparison with the structure information of device (referred to as "acquisition device 1") in the first step and determine a mutual relationship of master and slave, the power electronics device acquires information of itself or a different device (referred to as "acquisition device 2") stored in a structure management table by the device (S104).

Subsequently, connection information with respect to power and connection information with respect to communication between these two devices are checked (S105) to perform processing of checking whether connection relationships with respect to power and communication are found (S106). If both connection relationships are found, the flow proceeds to step S107 to determine a master/slave relationship, and, otherwise, the flow returns to step S102. Similar to processing of deciding whether the above-mentioned structure file is unanalyzed, this check processing may be omitted. Here, although the flow proceeds to step S107 only in a case where the connection relationships with respect to power and communication are found, it is possible to employ a configuration such that the flow proceeds to step S107 even in a case where only the connection relationship with respect to power is found. Also, as described below, a decision may be made according to a flow in FIG. 16.

Subsequent steps denote a basic decision algorithm to determine a master and a slave between devices (e.g. power electronics device, EMS and local controller) according to the first embodiment and the second embodiment described below.

In step S107, the device type information of the acquisition device 1 and the device type information of the acquisition device 2 are compared to determine a master device and slave device by three rough patterns. To be more specific, the master device and the slave device are determined based on whether one device is alternating-current/direct-current (AC/DC) and the other device is direct-current/direct-current (DC/DC), whether both devices are alternating-current/direct-current (AC/DC) and whether both devices are direct-current/direct-current (DC/DC).

For example, in a case where one device is alternating-current/direct-current (AC/DC) and the other device is direct-current/direct-current (DC/DC), this corresponds to information comparison between the power electronics device (AC/DC) connected to a power network on the system side and the power electronics device (DC/DC) connected to a storage battery or natural energy. As illustrated in the example in FIG. 4, basically, the power electronics device (AC/DC) connected to the power system side accepts control such as active power or reactive power in cooperation with an upper EMS or local controller, and implements a control instruction such as power distribution to the other power electronics device (e.g. DC/DC). Therefore, to determine a master and slave with respect to power, it is preferable to preferentially select a power electronics device on the alternating-current/direct-current (AC/DC) side as a master (S110). After a master/slave relationship is determined, information on the structure management table is updated (S111). Details of this structure management table are described below again.

Meanwhile, for example, in a case where both devices are alternating-current/direct-current (AC/DC), this corresponds to information comparison between multiple power electronics devices (AC/DC) connected to the power network on the system side, in the structure example in FIG. 4. Since this case relates to an operation at the time when the multiple power electronics devices operate in parallel and expansion of the power capacity is intended, one device of the multiple devices is selected as a device having a role of master, and, based on a reference value of the device, synchronization control is implemented for the other power electronics devices. As a selection criterion of the master device in this case, it is preferable to use at least one of: connectivity with the upper EMS or local controller; magnitude of the total power value as a whole, including a slave power electronics device(s) thereof (i.e., electric energy which can be handled under each power electronics device); and information such as the number of slave power electronics devices.

In addition to the above information, it is possible to use information related to maintenance of a device operation state or version. In the example in FIG. 7, as an example, a state is described where a power electronics device having a larger number of managed slaves is preferentially selected as a master device (S108). After the master/slave determination, the structure management table is updated (S109).

Finally, for example, in a case where both devices are direct-current/direct-current (DC/DC), this corresponds to information comparison between multiple power electronics devices (DC/DC) connected to the storage battery or natural energy in the structure example in FIG. 4. A configuration is specifically assumed where multiple power electronics devices are connected to a common DC bus. In this case, since each power electronics device (DC/DC) inputs/outputs power on the terminal direct current line without being connected to an upper power system network, there are some decision criteria such as random selection and preferential selection of a power electronics device (DC/DC) activated first. In addition to these criteria, it is possible to use information related to maintenance such as a device operation state or version. In the example of FIG. 7, it presents a state where the device activated first is preferentially selected as a master device (S112). Similar to other examples, after that, the structure management table is updated (S113).

Here in addition to these three kinds of decision examples, there is a case where both devices to be compared are alternating-current/alternating-current (AC/AC). Although it is omitted in the example of the figure, it is possible to similarly apply other methods described herein, such as connectivity with an upper EMS or local controller, random selection, preferential selection of a device activated first, the total amount value of slave devices or the number.

The above-described master determination processing is naturally targeted for a power electronics device connected to the same power line as the own power electronics device and can be targeted for a different power electronics devices connected to another power line. In a case where the different power electronics device does not have a function of master determination processing, the master determination processing may be performed in response to a request from the different power electronics device. In this case, a result of processing (i.e. master/slave type) may be reported.

Figure 9:
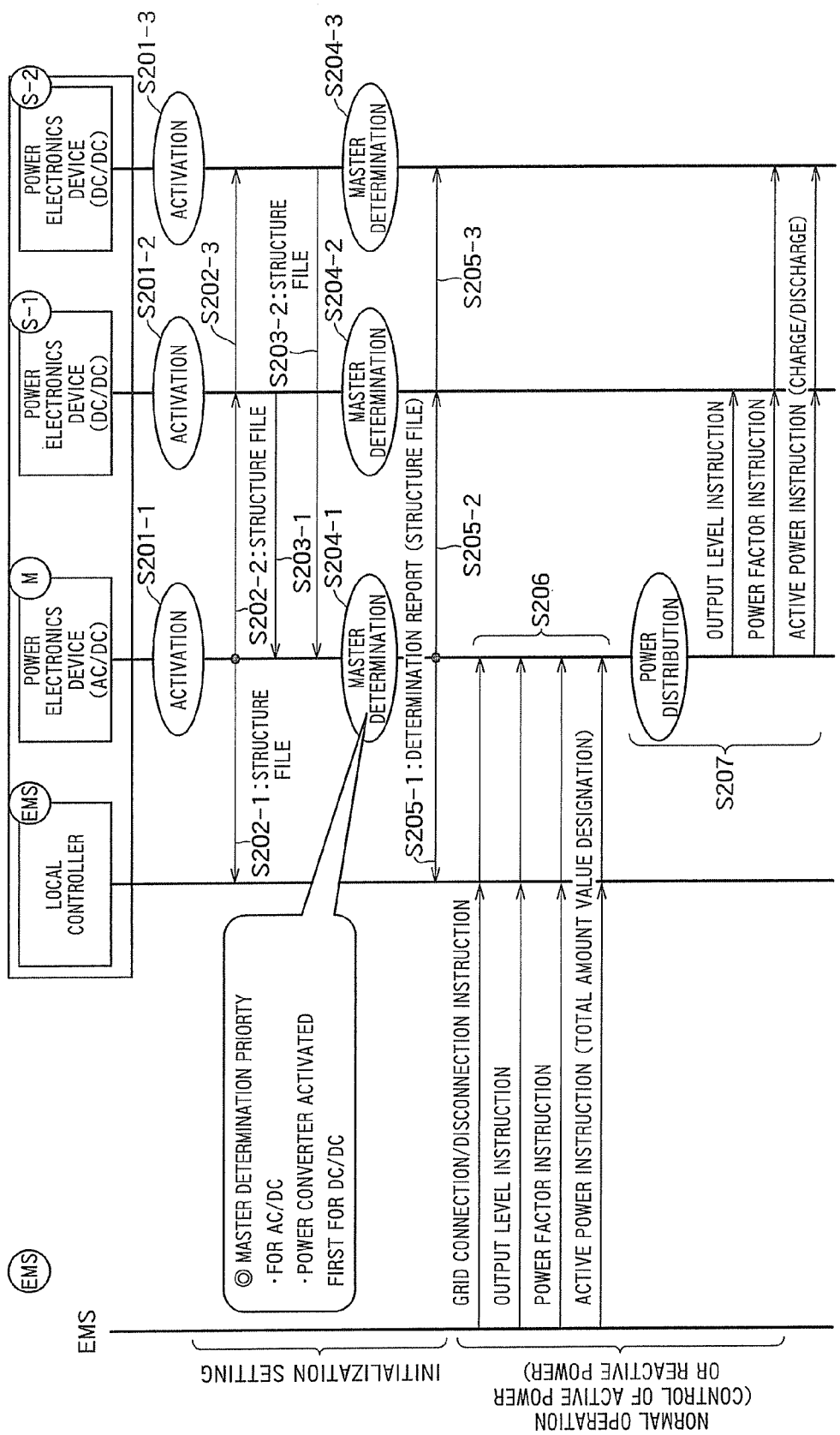
FIG. 9 is an operation sequence diagram of master determination processing according to the first embodiment.
Figure 11:
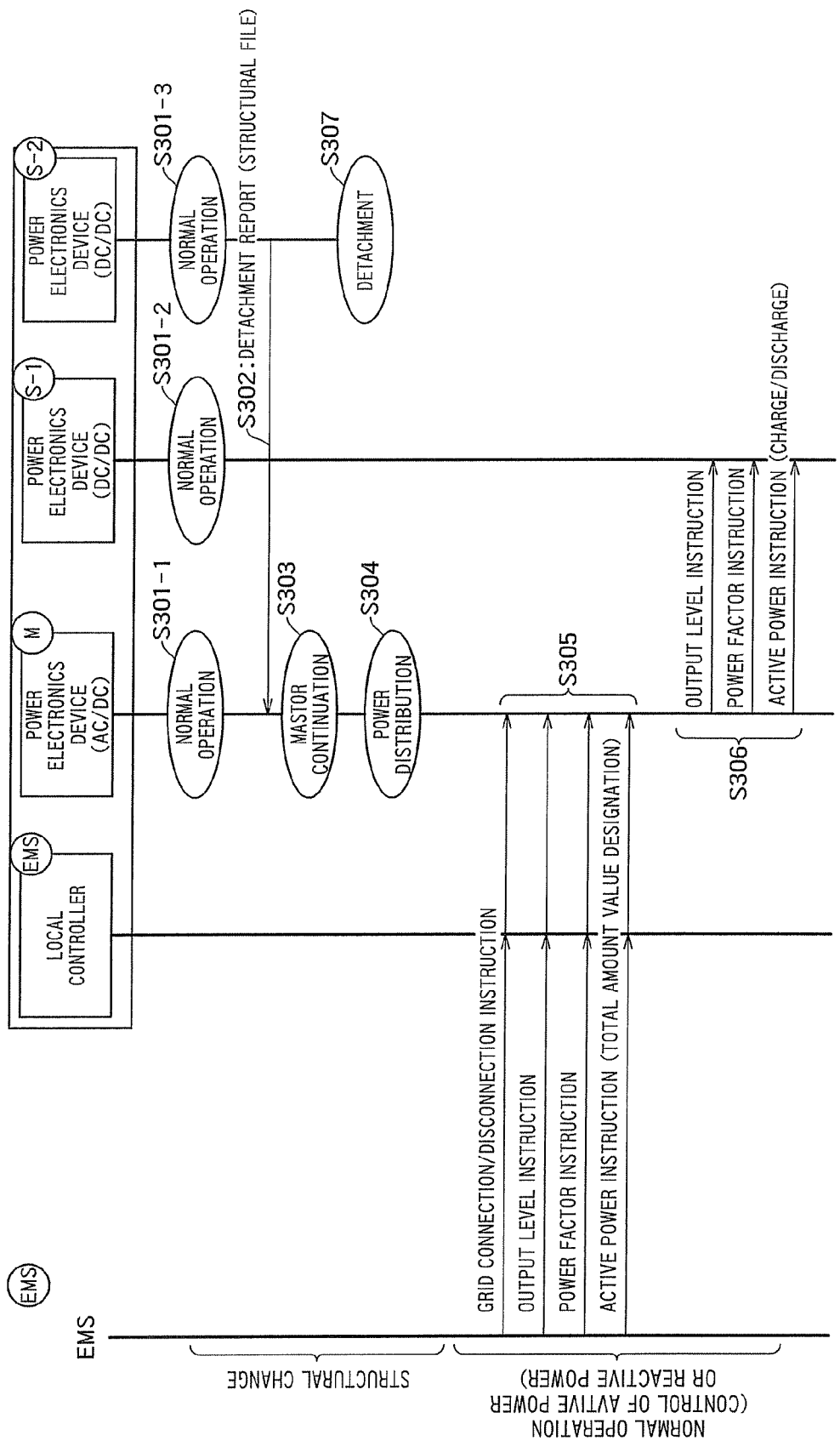
FIG. 11 is an operation sequence diagram of master/slave determination processing according to the first embodiment.

FIG. 9 and FIG. 11 illustrate operation sequences of processing of determining a master/slave between devices according to the first embodiment. FIG. 9 supports processing at the time of initial setting and FIG. 11 supports processing at the time of structural change.

An algorithm inside a device related to master/slave determination is basically processing in the operation flowchart presented in FIG. 7; however, as presented in FIG. 16 (i.e. decision flow as to whether to perform master determination processing) described below, they are different in decision as to whether to perform (or omit) an algorithm for master determination every time of initial setting or structural change.

For example, in cases where a certain power electronics device is activated and where a different power electronics device is already a master in the same group (i.e. connection with respect to power and connection with respect to communication are identical), as long as a particular state is not found such as an abnormal operation state, it is not necessary to perform the algorithm of master/slave determination again. Similarly to this, also regarding a case where it is possible to perform direct communication with a device that controls energy management in a system in a focused manner such as an EMS and a local controller, it is not necessary to perform the algorithm of master/slave determination again. However, it is not necessarily performed with respect to each step in FIG. 16, and a master/slave determination may be made every time information about structure management is exchanged.

In the operation sequence in FIG. 9, there are installed an EMS, a local controller, one power electronics device (AC/DC) and two power electronics devices (DC/DC). In the example in the figure, connection relationships with respect to power and communication between power electronics devices are basically a one-to-one correspondence, and illustration of wire information with respect to power is omitted.

As the first step, it is assumed that three power electronics devices are installed and activation processing of these devices is completed (S201-1, S201-2 and S201-3). At this time, a communication message including information of the structure file presented in FIG. 8 is generated and report processing is performed for a different device. Regarding the report processing, although there is a possible method of using push-type unicast communication or pull-type unicast communication for individual devices in addition to a method of performing simultaneous distribution using multicast/broadcast communication, it does not depend on a specific configuration. In the example in the figure, the power electronics device (AC/DC) reports a structure file to the local controller and two power electronics devices (DC/DC) (S202-1, S202-2 and S202-3). Also, two power electronics devices (DC/DC) each report a structure file to the power electronics device (AC/DC) (S203-1 and S203-2). In the figure, although illustration of a structure file from the local controller is omitted, actually, it is required to determine a master/slave relationship between the local controller and the power electronics device (AC/DC).

Figure 10:
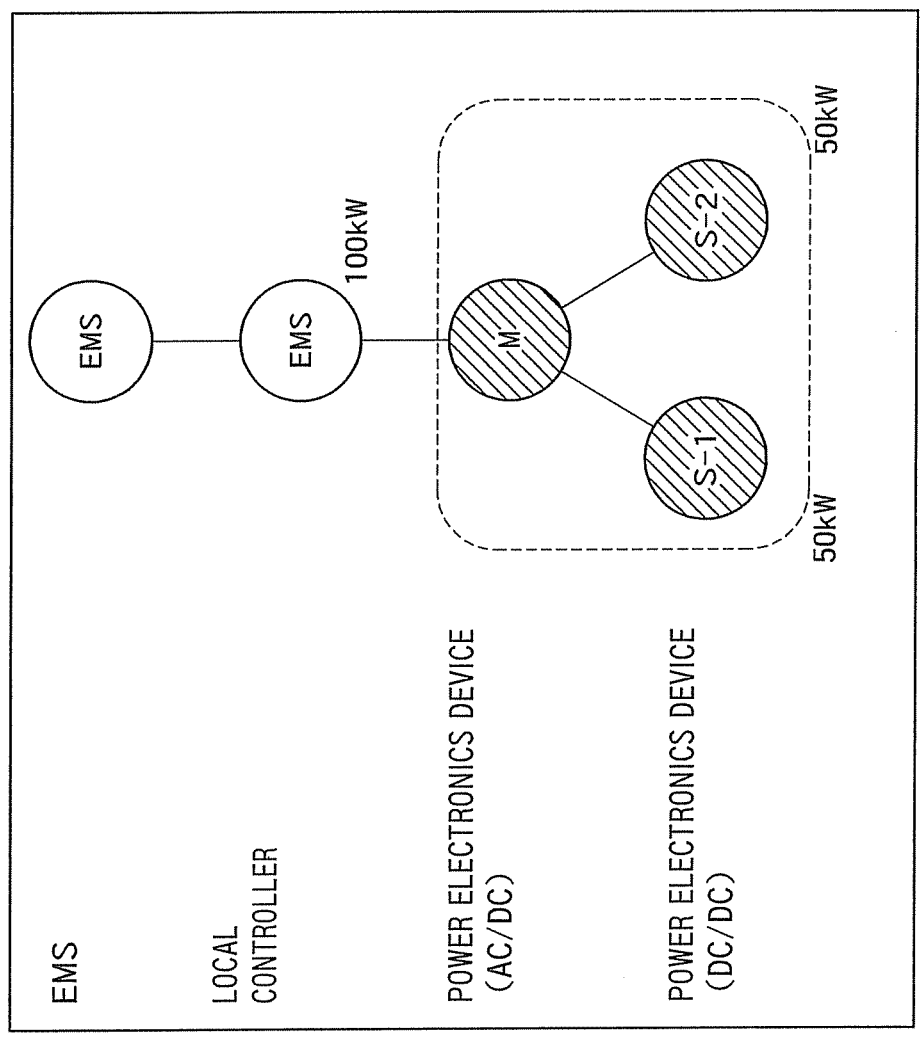
FIG. 10 is a view illustrating a hierarchical master/slave relationship example in which EMS is the top, according to the first embodiment.

As the second step in FIG. 9, the master/slave determination algorithm presented in FIG. 7 is performed on each device (S204-1, S204-2 and S204-3). As a result of this, under a decision criterion to preferentially determine a device on the alternating-current/direct-current (AC/DC) side, the power electronics device becomes a master of two directly-connected power electronics devices (DC/DC). After that, the power electronics device (AC/DC) determined as a master device generates and transmits a communication message to report the determination to the other devices (S205-1, S205-2 and S205-3). Since even other devices are subjected to master determination processing and acquire the same decision result, it is possible to employ a configuration in which the report is omitted. A role of the message can be realized by the same content as a communication message related to the above-mentioned structure file. By master determination, as presented in FIG. 10, a hierarchical master/slave relationship including the EMS as the top is formed. Application of the master/slave determination according to the embodiment is not limited to a power electronics device and it is appropriately applicable to the EMS or the local controller.

The third step in FIG. 9 relates to a normal operation. It is assumed that a control instruction (e.g. grid connection/disconnection instruction, output level instruction, power factor instruction and active power instruction (total amount value designation)) of active power or reactive power is issued from the EMS to the power electronics device (AC/DC) operating as the master via the local controller (S206). The power electronics device (AC/DC) interprets content of the instruction and implements a power distribution instruction to two power electronics devices (DC/DC) managed as slaves (S207).

Since a power electronics device according to the embodiment cannot supply power by itself, there can be a configuration in which it is appropriately connected to a storage battery or natural energy device as well as a configuration in which power from a power system network is utilized. Based on content of the control instruction from the higher order, two power electronics devices (DC/DC) operating as slaves implement charge/discharge control of a storage battery or the like connected to the devices. Regarding information such as control/setting/measurement at the time of normal operation, content as presented in FIG. 14 and FIG. 15 is provided. Details of FIG. 14 and FIG. 15 are described below.

Meanwhile, in the operation sequence in FIG. 11, there are installed an EMS, a local controller one power electronics device (AC/DC) and two power electronics devices (DC/DC). In the example in the figure, connection relationships with respect to power and communication between power electronics devices are basically a one-to-one correspondence, and illustration of wire information with respect to power is omitted.

As the first step, it is assumed that three power electronics devices perform normal operations after the master/slave determination already presented in FIG. 9 (S301-1, S301-2 and S301-3). Here, it is assumed that one power electronics device (DC/DC) connected to the natural energy device is exchanged for maintenance or disposal. In this case, before detachment from the hierarchical master/slave system (S307), a communication message to report the detachment is generated and transmitted (S302). A role of the message can be realized by the same content as a communication message related to the above-mentioned structure file.

As the second step in FIG. 11, the master/slave determination algorithm presented in FIG. 7 is performed on the power electronics device (AC/DC) that is already set as the master (S303). As a result of this, it is decided that a slave power electronics device (DC/DC) is merely detached and this does not influence on a master/slave relationship, and it continues an operation as the master of one directly-connected power electronics device (DC/DC) (S304).

Figure 12:
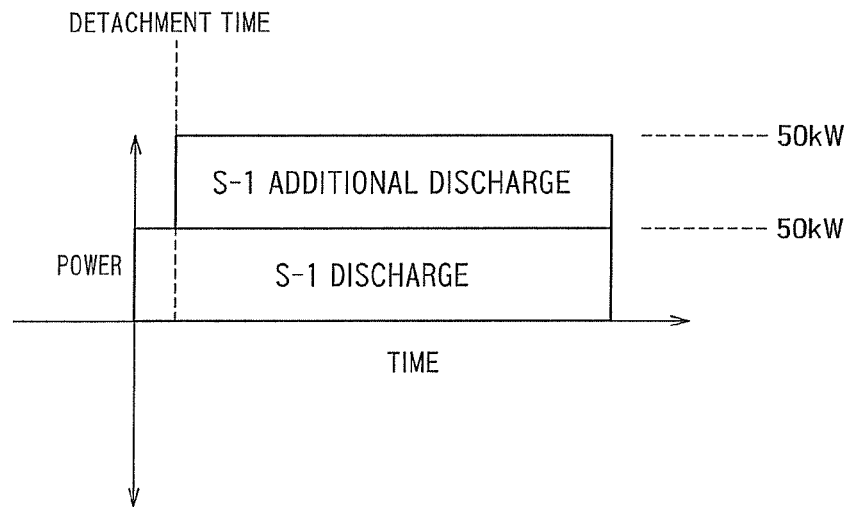
FIG. 12 is a view illustrating a variation example of an operation plan for maintenance of the total amount value according to the first embodiment.

However, the third step is different between FIG. 9 and FIG. 11. To be more specific, for example, in a case where two power electronics devices (DC/DC) are already used as slaves and power distribution of 50 kW is implemented in each of them, if one power electronics device is detached, it is not possible to maintain the total amount value of active power or reactive power instructed by a higher-order EMS or local controller. Therefore, as illustrated in the example in FIG. 12, an operation plan for maintenance of the total amount value is changed and instructed. To be more specific, in tandem with a detachment time of one power electronics device, a determination and report are performed to increase the power distribution amount of the other power electronics device. In addition to a method of managing these change and instruction inside the master device and performing control using a communication message in real time, there is a possible method of generating and controlling a schedule communication message based on information managed inside. It is however possible to use any method.

Figure 13:
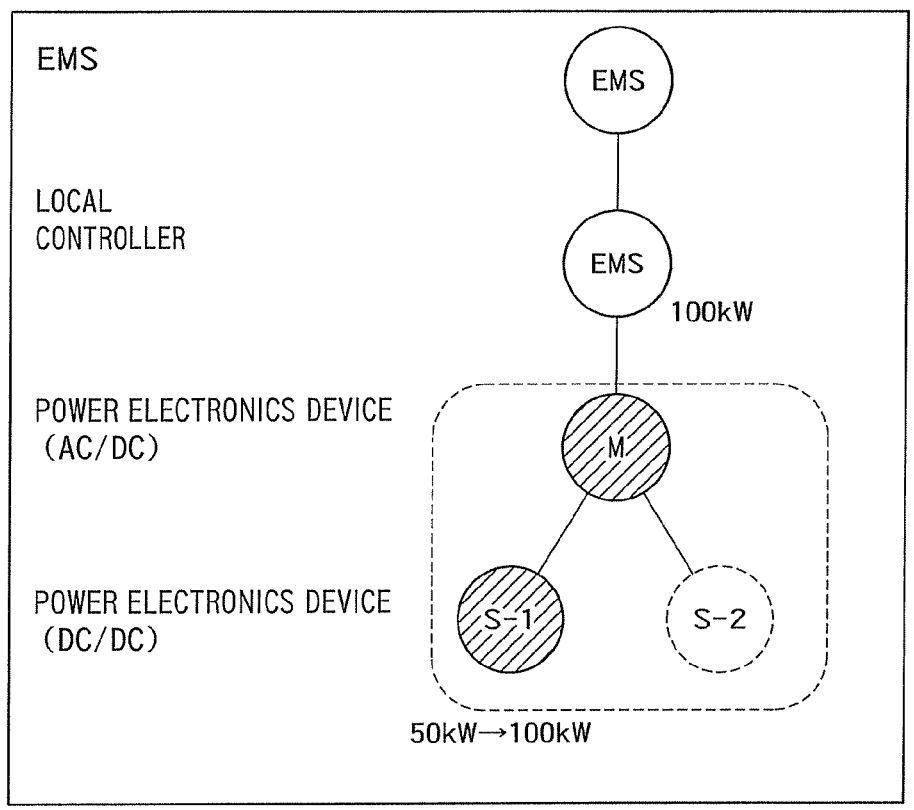
FIG. 13 is a view illustrating a power distribution operation example in which the number of slaves according to the first embodiment has changed from two to one.

It is assumed that a control instruction (e.g. grid connection/disconnection instruction, output level instruction, power factor instruction and active power instruction (total amount value designation)) of active power or reactive power is issued from the EMS to the power electronics device (AC/DC) operating as the master via the local controller (S305). The power electronics device (AC/DC) interprets content of the instruction and implements a power distribution instruction to one power electronics device (DC/DC) managed as a slave (S306). As described above, since a structural change occurs in a state where two power electronics devices are originally managed as slaves, a plan change and instruction for maintenance of the total amount are performed (see FIG. 12). As illustrated in the example in FIG. 13, based on content of the control instruction from the higher order, one power electronics device (DC/DC) operating as a slave implements charge/discharge control of a storage battery connected to the device. Regarding information such as control/setting/measurement at the time of normal operation, similar to the case of FIG. 9, content as presented in FIG. 14 and FIG. 15 is provided.

FIG. 14 presents examples of setting/control information exchanged between devices at the time of realizing active-power/reactive-power control and power distribution control between an EMS, a local controller and power electronics devices, according to the first embodiment. Not only these are set in a writing type at the time of control instruction but also it is possible to refer to set information in a reading type. Also, in the case of actually performing exchange between devices, similar to the case of a structure file, a communication message is generated and transmitted/received.

A connection state identifies whether a power electronics device is connected to an ECP (Electrical Connection Point). An available state of PV output identifies whether the PV is connected to the power electronics device. An available state of storage battery output identifies whether a storage battery is connected to a power electronics device. An available state of active-power/reactive-power control identifies whether active-power/reactive-power control is available. A state of a power electronics device identifies an operation state (during operation, inoperable and standby) of the power electronics device. A local/remote control state identifies whether a power electronics device operates alone or it is controlled by the local controller. Input power in a power electronics device denotes information to decide an input power value and the power efficiency of the power electronics device. A target value of active power denotes a target value (unit: W) of active power set on a power electronics device and a target value of reactive power denotes a target value (unit: VAR) of reactive power set on the power electronics device. A target value of power factor denotes a target value of power factor set on a power electronics device. An output level value of active power denotes an output level value (unit: %) of active power set on a power electronics device and an output level value of reactive power denotes an output level value (unit: %) of reactive power set on the power electronics device.

Meanwhile, the lower part of FIG. 14 illustrates examples of measurement information exchanged between devices at the time of realizing active-power/reactive-power control and power distribution control between an EMS, a local controller and power electronics devices, according to the first embodiment. The current value of active power denotes the current value of active power output by a power electronics device, and upper and lower limit values (unit: W). The current value of reactive power denotes the current value of reactive power output by a power electronics device, and upper and lower limit values (unit: VAR). The unit voltage per phase includes information of unit voltage and upper and lower limit values. Also, the current value of power factor includes the current value and upper and lower limit values.

The lower part of FIG. 15 presents examples of fixed information exchanged between an EMS, a local controller and power electronics devices according to the first embodiment. It is assumed that the fixed information is stored in a nonvolatile storage medium at the time of shipment of products, and writing from other devices on a communication network is not performed. It is assumed that such fixed information includes manufacture information, model information, serial number information, rated active power, rated apparent power, rated reactive power, maximum charge rate, maximum discharge rate and source information of time synchronization.

Also, the upper part of FIG. 15 illustrates measurement information in a case where a storage battery (BMU) is connected to a power electronics device. This information includes information of rated capacity, SOC (State of Charge), available electric energy, maximum charge rate, maximum discharge rate and storage battery internal voltage. Although there is similar unique information with respect to natural energy such as solar power generation and wind power generation, in most cases, since it overlaps with a storage battery and is basically interpreted as a storage battery for discharge and charge as described above, explanation of the drawings according to the first embodiment is omitted.

Figure 16:
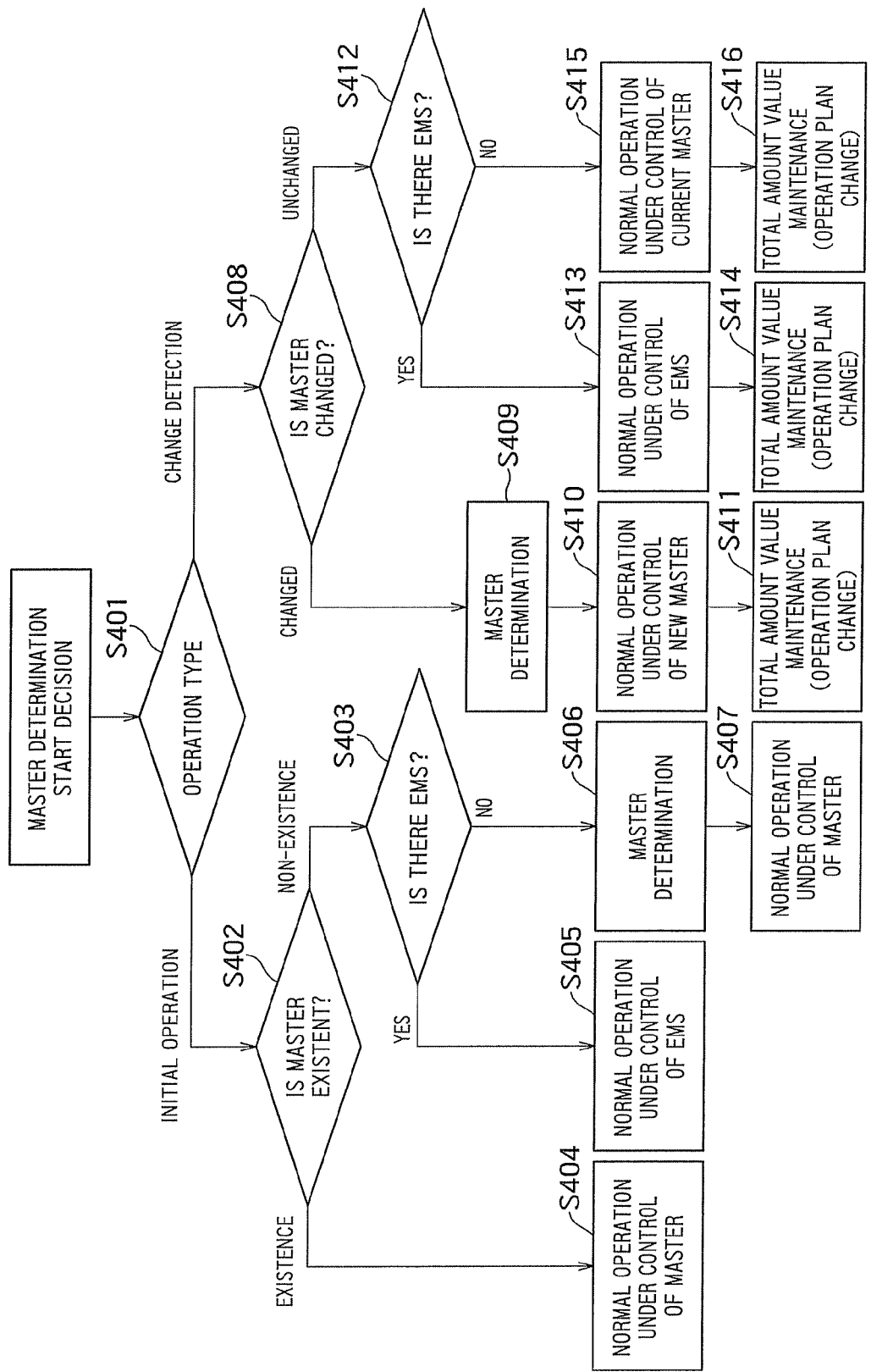
FIG. 16 is a decision flowchart as to whether to perform master determination processing according to the first embodiment.

FIG. 16 illustrates an operation flowchart related to decision (i.e. master determination start decision) as to whether to perform master determination processing according to the first embodiment. The operation can be inserted in master determination processing (S204-1, S204-2, S204-3 and S303) in the examples in FIG. 9 and FIG. 11. A specific master/slave determination algorithm follows the procedure presented in FIG. 7. In a case where there is a power electronics device, each EMS or local controller already selected as a master on the same system (i.e. the same power line), it is not necessary to determine a master or slave again. The flow in FIG. 16 will now be explained in detail.

As illustrated in FIG. 16, an operation type is decided (S401), and, in the case of the initial operation (i.e. "initial operation" in S401), a structure file is acquired to check whether a power electronics device as a master and an EMS are existent (S402 and S403). In a case where they are not existent ("non-existence" in S402 and "No" in S403), master determination processing is performed (S406). To be more specific, the procedure in FIG. 17 (which extracts part of the processing flow in FIG. 7) is performed. That is, a structure file is analyzed (S501), an alternating-current/direct-current (AC/DC) power electronics device is preferentially determined as a master (S502) and a structure management table described below is updated (S503). After a master is determined, a normal operation is performed under the control of the master (S407). Also, in a case where the master is not existent and the EMS is existent ("non-existence" in S402 and "Yes" in S403), the normal operation is performed under the control of the EMS (S405). Also, when the master is existent ("existence" in S402), the normal operation is performed under the control of the master (S404).

Figure 17:
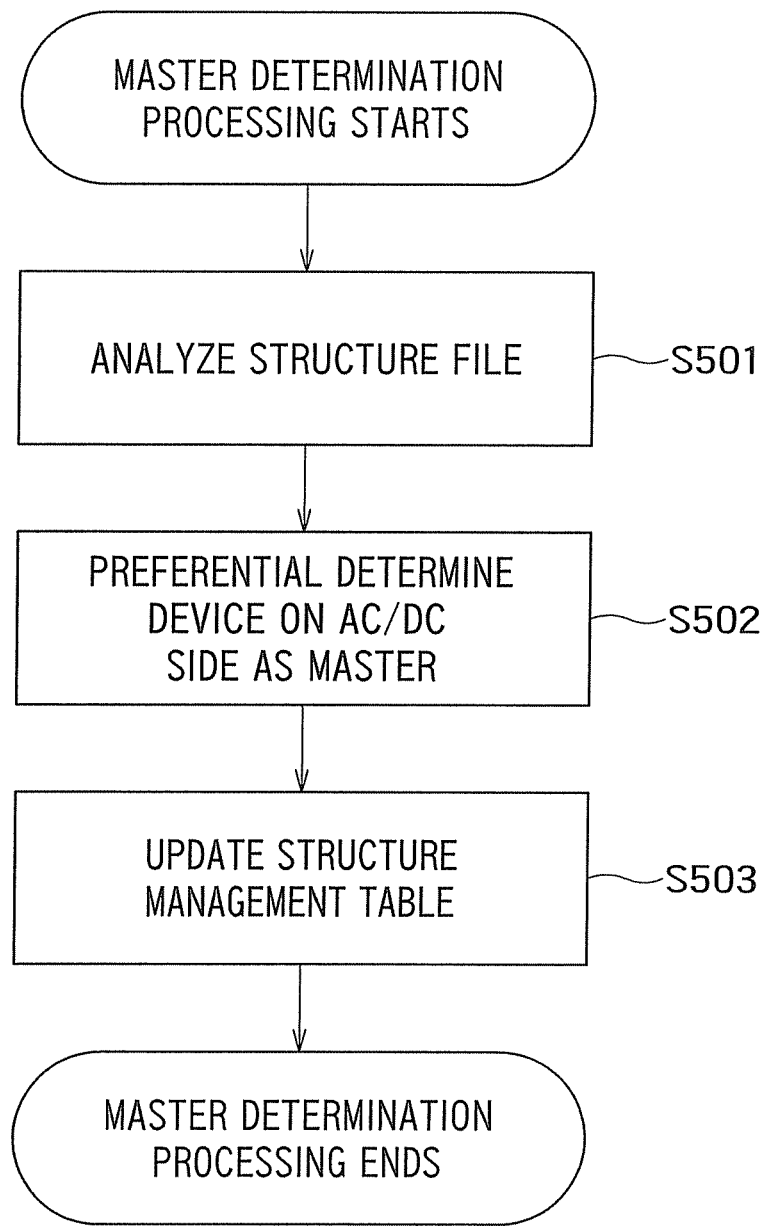
FIG. 17 is an operation flowchart of master determination processing according to the first embodiment.

Also, as illustrated in FIG. 11, in a case where a structural change occurs by detachment of a device or the like ("change detection" in S401), whether there is an influence on the master/slave relationship (i.e. whether the master can be changed) is checked (S408), and, in a case where it can be changed, the master determination algorithm in FIG. 17 is performed (S409). When the master is determined, the normal operation is performed under the control of the new master (S410) and an operation plan change is performed so as to maintain the total amount value if necessary (S411). In a case where the master is not changed and the EMS is not existent ("unchanged" in S408 and "No" in S412), the normal operation is performed under the control of the current master (S415) and the operation plan change is performed so as to maintain the total amount value if necessary (S416). In a case where the master is not changed and the EMS is existent ("unchanged" in S408 and "Yes" in S412), the normal operation is performed under the control of the EMS (S413) and the operation plan change is performed so as to maintain the total amount value if necessary (S414).

Also, as described above, each EMS and a controller according to the embodiment can be treated in the same way as a power electronics device, device type information (i.e. power conversion characteristic information) in this case may be appropriately associated with alternating-current/alternating-current (AC/AC), alternating-current/direct-current (AC/DC) and direct-current/direct-current (DC/DC) information or information to identify the EMS. Basically, when the EMS and the power electronics device are compared, since orders from the higher order are processed in a focused manner, it can say that it is likely to be preferentially selected as a master.

Thus, according to the first embodiment, in a case where multiple power electronics devices having a communication function perform autonomous cooperative control, it is possible to automatically determine a master and a slave. Therefore, even in the case of expansion or structural change in a power electronics device, it is possible to adequately perform power control such as power source phasing control and power distribution control while suppressing a load on a manager. That is, while the flexibility of installation locations for power electronics devices is maintained, at the time of expansion or maintenance, it is possible to automatically increase the capacity, maintain the total amount of charge/discharge power throughputs of distributed power sources and increase the power throughput.

Second Embodiment

The second embodiment relates to power source phasing control to operate multiple converters in parallel and realize an increase of an input/output amount of power. As described above, the power source phasing control is applied in a case where multiple power electronics devices are connected to the same power bus line. Especially, in a case where multiple power electronics devices (AC/DC) are operated in parallel, it is an object to prevent an occurrence of cross current (e.g. reactive current caused by a difference of electromotive force, synchronization cross current caused by a phase difference of electromotive force and harmonic cross current caused by a waveform difference of electromotive force) in an output on the alternating-current side. To prevent the cross current and install the multiple power electronics devices in parallel in the bus line, it is necessary to match waveforms of voltage, phase, frequency and electromotive force. At the time of causing multiple power electronics devices to operate in synchronization, cross current normally occurs due to variation in the switching time of IGBT, and, as means to realize a power source phasing, there is a possible configuration to realize synchronization of phase signals using wire communication such as an optical fiber. However, as illustrated in the related art, realization by around two power electronics devices is normally assumed and application to a large number is not assumed. The present embodiment suggests a measurement to solve this problem.

Figure 18:
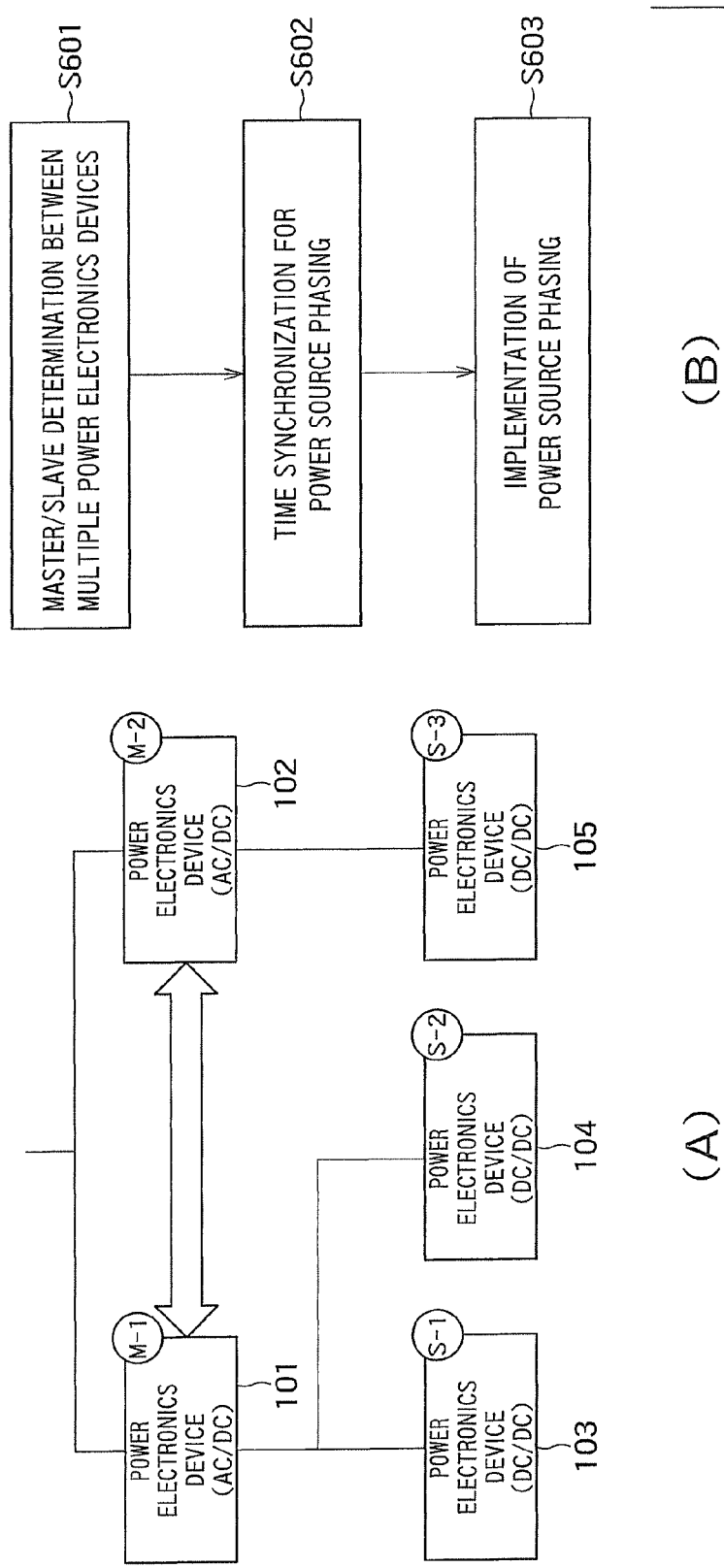
FIG. 18 is a system structure view of multiple power electronics devices according to the second embodiment.

FIG. 18(A) presents a system structure by multiple power electronics devices according to the second embodiment. In an example in the figure, there are two power electronics devices (AC/DC) 101 and 102 connected to the alternating-current side and three power electronics devices (DC/DC) 103, 104 and 105 connected to a storage battery (BMU) or natural energy on the direct-current side. The power electronics device 101 a master device with respect to the power electronics devices 103 and 104, and the power electronics device 102 is a master device with respect to the power electronics device 105.

Although the first embodiment provides a case where multiple power electronics devices (DC/DC) are connected to one power electronics device (AC/DC) as a master, the second embodiment assumes that there are multiple power electronics devices (AC/DC) as master candidates. Therefore, as illustrated in FIG. 18(B), after a master and a slave are determined between multiple power electronics devices 101 and 102 on the hierarchical structure (S601), time synchronization for a power source phasing is performed (S602) and power source phasing control is performed (S603).

Thus, to realize a power source phasing function to operate multiple power electronics devices in parallel, it is essential to determine a synchronization source master on multiple layers. In a case where power units of the same performance are operated in the same bus line, only by electrical information, it is not possible to identify to which device they should be applied. In implementation of a power source phasing after a master is determined, although active power and reactive power are set, synchronization of the power source phasing (i.e. frequency value) and synchronization of a carrier phase (current/voltage) are implemented in each slave based on an instruction value from the master, their details are omitted.

Figure 19:
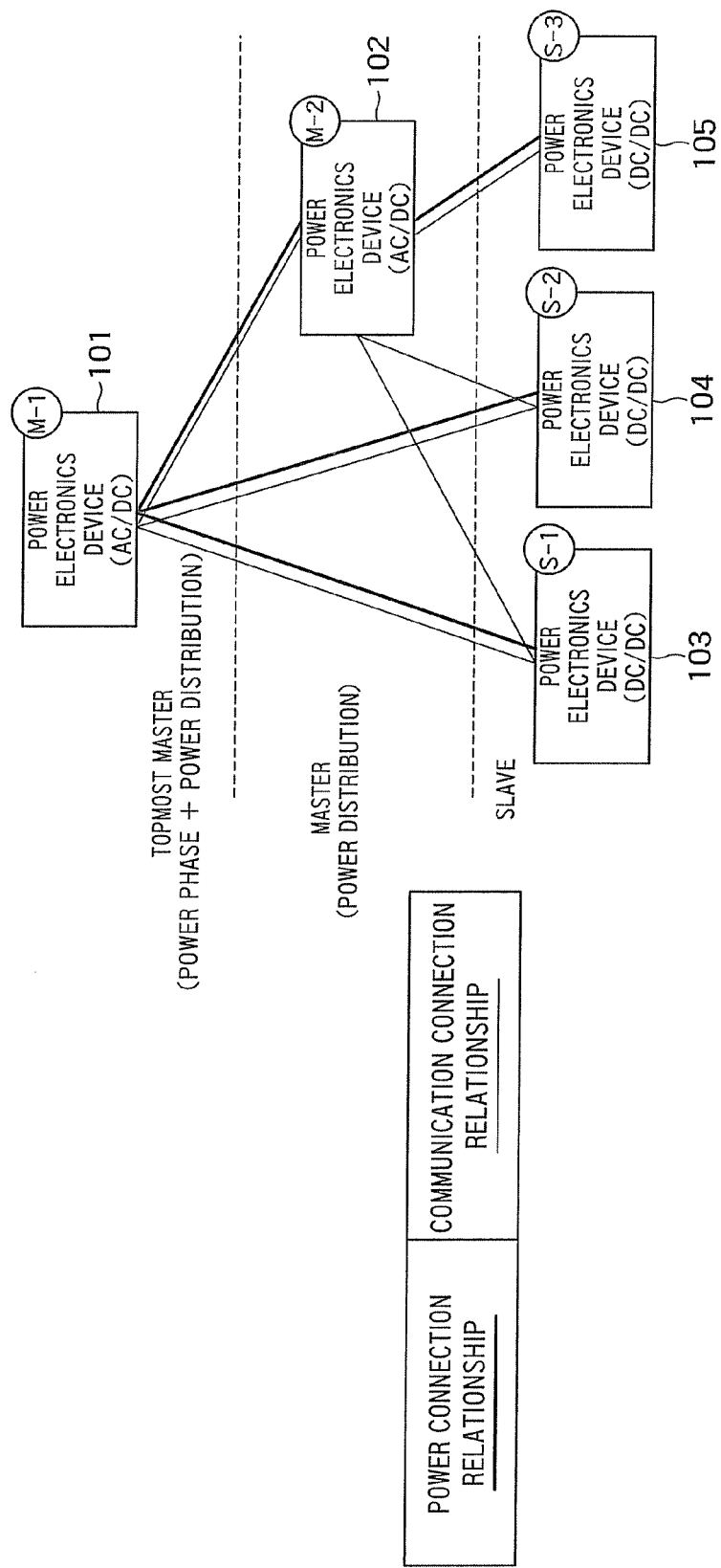
FIG. 19 is a system structure view of multiple power electronics devices according to the second embodiment.

FIG. 19 presents a view detailing a concept of the second embodiment. Similar to the example in FIG. 18, two power electronics devices (AC/DC) 101 and 102 and three power electronics devices (DC/DC) 103, 104 and 105 are installed. There are connection relationships with respect to communication and connection relationships with respect to power between these power electronics devices. Also, there are various power applications such as power distribution and a power source phasing. Taking into account these connection relationships and applications, master/slave structure management is determined. Under an environment in which there are multiple AC/DC power electronics devices, masters and slaves are provided in a multistage structure, and, in an example in FIG. 19, there are the topmost master (power source phasing+power distribution), a master (power distribution) and slaves.

Figure 20:
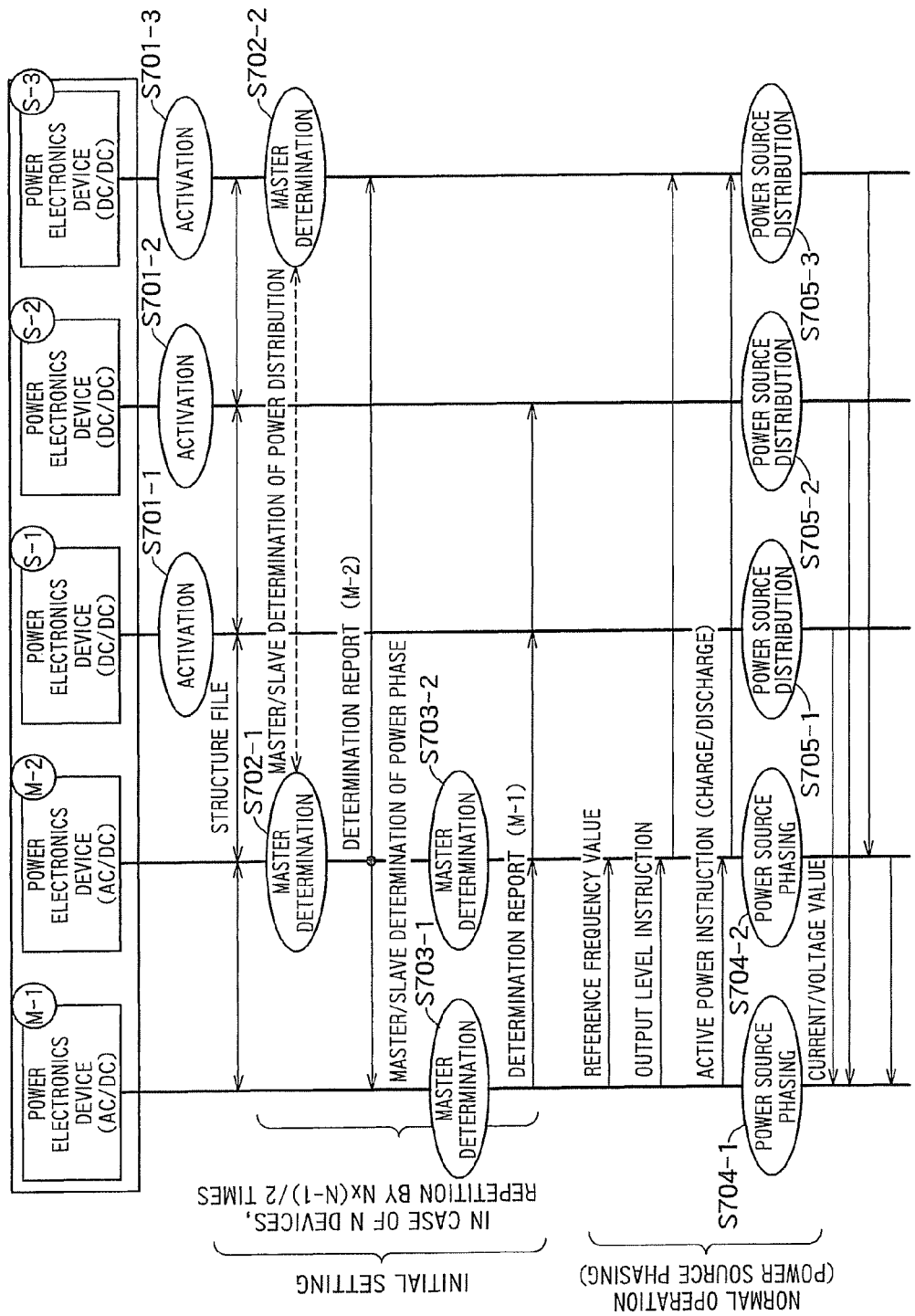
FIG. 20 is a view illustrating an operation sequence of master determination processing according to the second embodiment.
Figure 21:
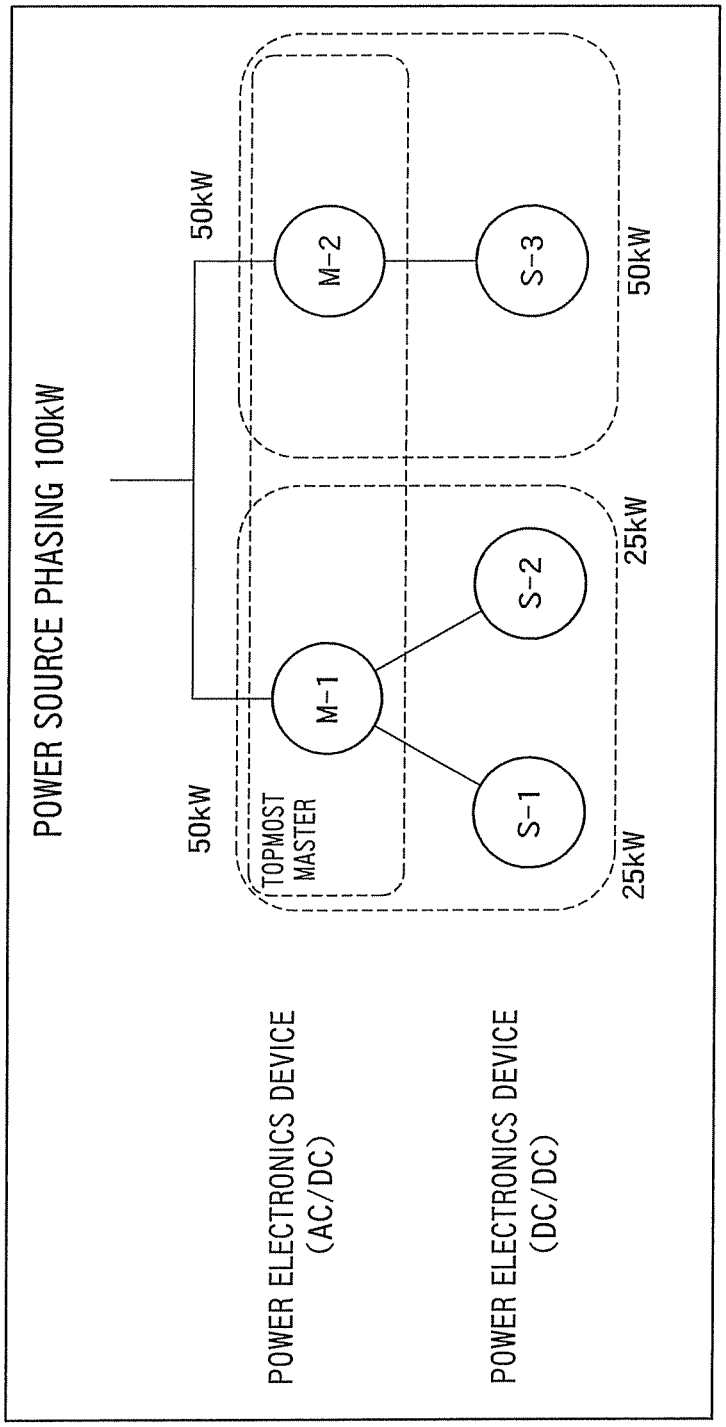
FIG. 21 is a view illustrating a hierarchical structure example of the topmost master, master and slave according to the second embodiment.
Figure 23:
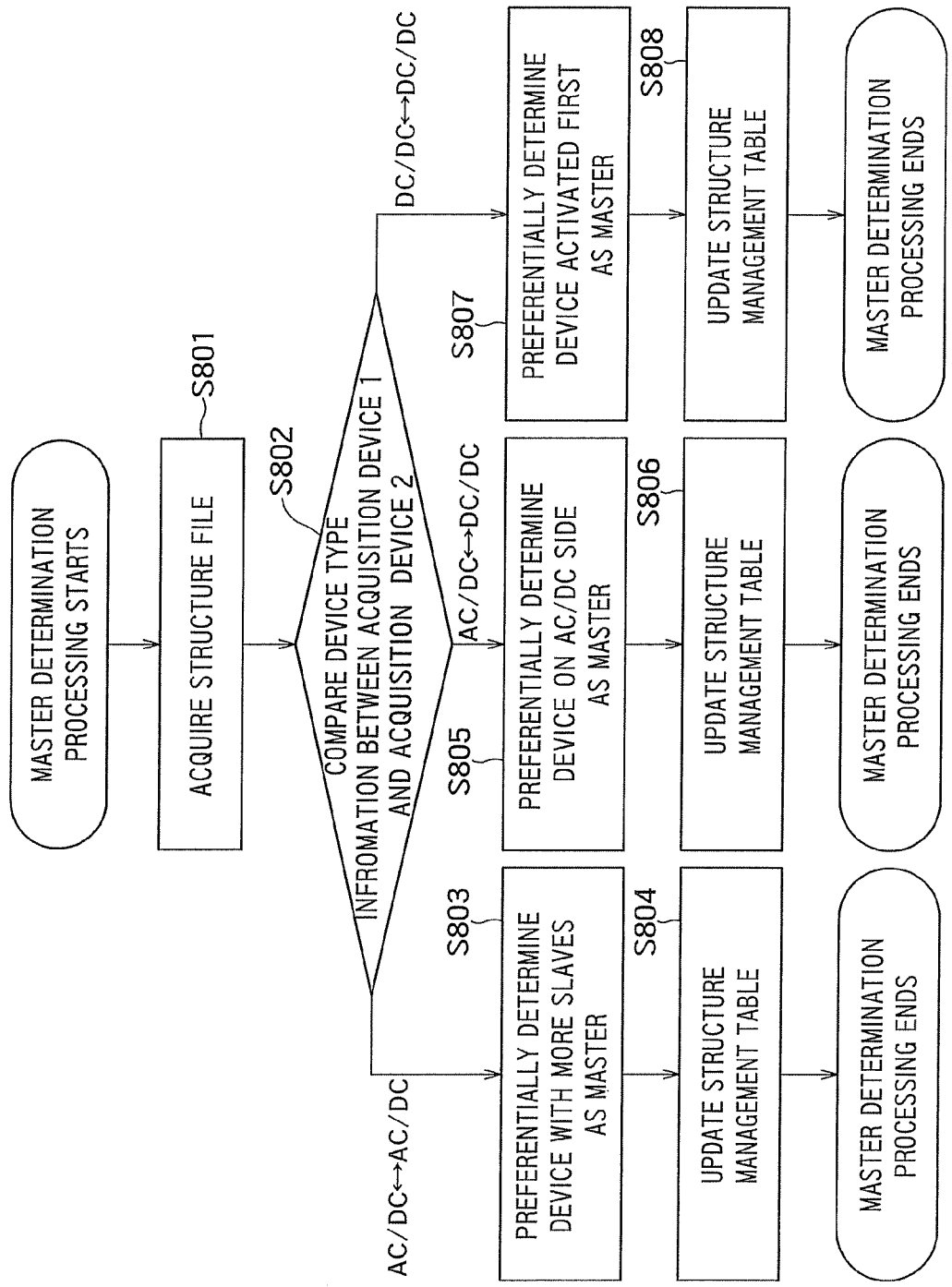
FIG. 23 is a decision flowchart of master determination according to the second embodiment.

FIG. 20 presents an operation sequence related to implementation of master/slave determination and power source phasing control between multiple power electronics devices according to the second embodiment. FIG. 21 illustrates a supplemental explanation view of FIG. 20. FIG. 22 presents master preference criteria every device type information. FIG. 23 presents a specific processing flowchart at the time of master determination processing. These operations basically follow the first embodiment and embody the operation flowchart in FIG. 7.

In the example illustrated in FIG. 20, two power electronics devices (AC/DC) and three power electronics devices (DC/DC) are installed, and it is assumed that, as illustrated in FIG. 19, these multiple power electronics devices mutually have connection relationships with respect to power and communication. The power electronics devices exchange communication messages including structure file information and make a decision (i.e. master determination start decision) as to whether to perform master/slave determination processing, and subsequently start specific determination processing as illustrated in FIG. 23. Also, decision as to whether to perform master determination processing includes the decision (see S106 in FIG. 7) based on whether matched connection relationships with respect to power and matched connection relationships with respect to communication are provided, in addition to the decision flowchart in FIG. 16 presented in the first embodiment; however, as described above, it is possible to omit the decision as to whether to perform it.

As illustrated in FIG. 23, structure files are acquired (S801) and type information of target devices are compared (S802). Here, structure file information includes device type information of the power electronics device, and a master and a slave are determined between two devices according to the preference criteria in FIG. 22.

Figure 24:
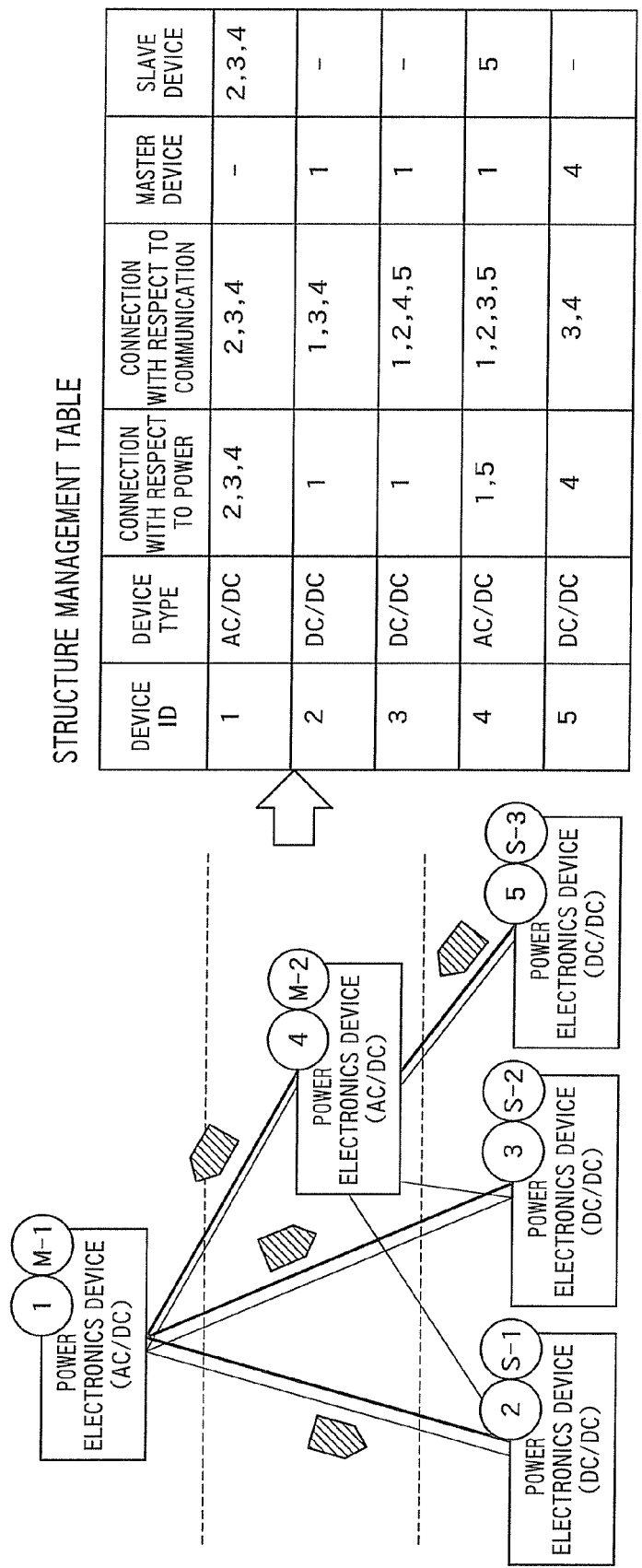
FIG. 24 is a view illustrating a structure management table held in each power electronics device according to the second embodiment.

To be more specific, in connection between a power electronics device (AC/DC) and a power electronics device (AC/DC), since a power source phasing application is implemented, the master is determined taking into account the total amount value of slaves, the number of slaves and the connectivity with an upper order (S803). After the determination, as illustrated in FIG. 24 described below, a structure management table is updated (S804).

In the case of a power electronics device (AC/DC) and a power electronics device (DC/DC), since a power distribution application is implemented as presented in the first embodiment, the power electronics device (AC/DC) side connected to alternating current is preferentially determined as a master (S805). After the determination, the above structure management table is updated (S806).

Meanwhile, in the case of a power electronics device (DC/DC) and a power electronics device (DC/DC), there is a possible method of preferentially determining a power electronics device activated at first or a power electronics device having connectivity to an upper order as a master (S807). After the determination, the above structure management table is updated (S808).

In an example in FIG. 20, this comparison decision processing for master/slave determination is performed several times. Specifically, the illustrated example includes performing processing on a combination of power electronics devices M-2 and S-3 and a combination of power electronics devices M-1 and M-2 (S702-1, S702-2, S703-1 and S703-2). It is however performed for other devices in the same way. When the number of devices is N, the processing is performed N×(N−1)/2 times. As a result, as illustrated in FIG. 21, one power electronics device M-1 (AC/DC) is determined as the topmost master, one power electronics device M-2 (AD/DC) is determined as a master, two power electronics devices S-1 and S-2 (DC/DC) are determined as M-1 slaves and one power electronics device S-3 (DC/DC) is determined as an M-2 slave.

Also, the power electronics device M-2 is a slave of the power electronics device M-1, and therefore, at the time of power source phasing control, performs time synchronization and each phase control based on information issued from the master (S704-1 and S704-2). Also, the power electronics device M-1 performs power distribution control on the power electronics devices S-1 and S-2 (S705-1 and S705-2). Also, the power electronics device M-2 performs power distribution control on the power electronics device S-3 (S705-3).

Also, as illustrated in the left of FIG. 24, in addition to a configuration in which each measurement information at the time of actual operations is transmitted to the master of each power electronics device, there is a possible configuration in which it is transmitted to a device having a connection relationship with respect to communication. It is however possible to combine and implement them without depending on a specific configuration. A format of a communication message including structure file information is as illustrated in FIG. 25, with a communication header.

By integrating information on a system after each decision processing according to the second embodiment is performed, a structure management table as illustrated in the right of FIG. 24 is commonly stored on each power electronics device. The table using a device ID as a key describes individual information of a device type, a device having a connection relationship with respect to communication, a master device of that device and a slave device of that device.

For example, it is found that a power electronics device M-2 (AC/DC) of the device ID of 4 denotes a power electronics device having: a device type of alternating-current/direct-current (AC/DC); connection with respect to power with device ID's of 1 and 5; and connection with respect to communication with device ID's of 1, 2, 3 and 5, in which a master device of that device has a device ID of 1 and a slave device of that device has a device ID of 5. Also, the management table in the figure assumes the system structures in FIG. 19 and FIG. 21.

Also, although a power electronics device can have a configuration to selectively store only information of other devices having a direct connection relationship with the own device or a configuration to store information of all other devices included in the system, operations are possible using any format.

Thus, according to the second embodiment, even in a case where masters having each slave are connected to the same power line, it is possible to automatically determine a higher master between these masters. Therefore, even at the time of expansion or maintenance of a power electronics device, it is possible to appropriately perform power control such as power source phasing control and power distribution control. Further, it is possible to automatically increase the capacity, maintain the total amount of charge/discharge power throughputs of distributed power sources and increase the power throughput.

The power electronics devices which have been heretofore described may also be realized using a general-purpose computer device as basic hardware. That is, the power electronics devices can be realized by causing a processor mounted in the above described computer device to execute a program. In this case, the power electronics device may be realized by installing the above described program in the computer device beforehand or may be realized by storing the program in a storage medium such as a CD-ROM or distributing the above described program over a network and installing this program in the computer device as appropriate. Furthermore, the storage in the power electronics device may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power electronics device comprising:
  a first connector connectable to a first power line of a plurality of power lines interconnecting the power electronics device and a plurality of other power electronics devices;
  a second connector connectable to a second power line of the plurality of power lines;
  a power converter configured to convert power input from one of the first connector and the second connector and output converted power from the other of the first connector and the second connector; and
  a controller configured to select a master device from power electronics devices connected to one of a plurality of power lines including the first power line and the second power line, based on power conversion characteristic information of the power electronics devices, the master device controlling other power electronics devices, regarding input/output power from/to the one of the plurality of power lines, by transmitting control commands to the other power electronics devices, wherein
  the controller is configured to, when one of the power electronics devices has a conversion function from alternating current to direct current (AC/DC) and a remainder of the power electronics devices has a conversion function from direct current to direct current (DC/DC), select, as the master device, the one of the power electronics devices, and
  the controller is configured to, when two or more of the power electronics devices have a conversion function from alternating current to direct current (AC/DC), select the master device based on a number of lower-order power electronics devices under each of the two or more power electronics devices in a case that numbers of lower-order power electronics devices under the two or more power electronics devices are different from each other.

2. The power electronics device according to claim 1, wherein:
  the one of the plurality of power lines is one of the first power line and the second power line; and
  the power electronics devices connected to the one of the plurality of power lines includes the power electronics device itself.

3. The power electronics device according to claim 1, wherein the controller is configured to, when all of the power electronics devices have a conversion function from alternating current to direct current (AC/DC), select the master device based on the capability of handling electrical power in a case that capabilities of handling electrical power of the power electronics devices are different from each other.

4. The power electronics device according to claim 1, wherein the controller is configured to, when all of the power electronics devices have a conversion function from direct current to direct current (DC/DC), select, as the master device, a power electronics device activated first among the power electronics devices in a case that the power electronics devices are activated at different timings.

5. The power electronics device according to claim 1, wherein, by performing a connection check procedure for the first power line or the second power line, the controller is configured to detect a power electronics device connected to the first power line or the second power line.

6. The power electronics device according to claim 1, further comprising:
  an information storage configured to store power conversion characteristic information of the power electronics device itself; and
  a communicator configured to perform wired or wireless communication, wherein:
  the communicator is configured to transmit information in the storage to power electronics devices capable of communicating with the communicator;
  the communicator is configured to receive power conversion characteristic information held in the power electronics devices capable of communicating with the communicator; and
  the storage is configured to store therein power conversion characteristic information received by the communicator.

7. The power electronics device according to claim 1, further comprising:
  a storage configured to store hierarchical structure information indicating a type of a master device or a slave device for each of the power electronics devices connected to the one of the plurality of power lines, the slave device being a power electronics device, except the master device, out of the power electronics devices connected to the one of the plurality of power lines; and
  a communicator configured to perform wired or wireless communication, wherein the communicator is configured to transmit information in the storage to power electronics devices capable of communicating with the communicator;

the communicator is configured to receive hierarchical structure information held in the power electronics devices capable of communicating with the communicator; and the storage is configured to store therein the hierarchical structure information received by the communicator.

8. The power electronics device according to claim 2, wherein, the power electronics device itself is configured to perform, in a case of being selected as the master device, at least one of power phase control and power distribution control for other power electronics devices, except the power electronics device itself, out of the power electronics devices connected to the one of the plurality of power lines.

9. A cooperative control method comprising:

reading out, from a storage, power conversion characteristic information of first power electronics devices out of a plurality of power electronics devices interconnected via a plurality of power lines, each of the power electronics devices converting power input from one power line of power lines to output converted power to another power line of the power lines, the first power electronics devices being connected to a first power line of the power lines; and selecting, by a controller, a master device from the first power electronics devices, the master device controlling other power electronics devices, except the master device, out of the first power electronics devices, regarding output of power to the first power line, by transmitting control commands thereto;

the selecting, by the controller, comprising, when one of the power electronics devices has a conversion function from alternating current to direct current (AC/DC) and a remainder of the power electronics devices has a conversion function from direct current to direct current (DC/DC), selecting, as the master device, the one of the power electronics devices; and the selecting, by the controller, comprising, when two or more of the power electronics devices have a conversion function from alternating current to direct current (AC/DC), selecting the master device based on a number of lower-order power electronics devices under each of the two or more power electronics devices in a case that numbers of lower-order power electronics devices under the two or more power electronics devices are different from each other.

10. A non-transitory computer readable medium having instructions stored therein, which, when executed by a computer, cause the computer to execute processing comprising:

reading out, from a storage, power conversion characteristic information of first power electronics devices out of a plurality of power electronics devices interconnected via a plurality of power lines, each of the power electronics devices converting power input from one power line of power lines to output converted power to another power line of the power lines, the first power electronics devices being connected to a first power line of the power lines; and selecting a master device from the first power electronics devices, the master device controlling other power electronics devices, except the master device, out of the first power electronics devices, regarding output of power to the first power line, by transmitting control commands thereto;

the instructions, when executed, cause the computer to execute, when one of the power electronics devices has a conversion function from alternating current to direct current (AC/DC) and a remainder of the power electronics devices has a conversion function from direct current to direct current (DC/DC), selecting, as the master device, the one of the power electronics devices; and the instructions, when executed, cause the computer to execute, when two or more of the power electronics devices have a conversion function from alternating current to direct current (AC/DC), selecting the master device based on a number of lower-order power electronics devices under each of the two or more power electronics devices in a case that numbers of lower-order power electronics devices under the two or more power electronics devices are different from each other.

11. A cooperative control system comprising:

a higher-order control device;

a plurality of power electronics devices, at least one of the power electronics devices comprising:

a first connector connectable to a first power line of a plurality of power lines interconnecting the power electronics device and a plurality of other power electronics devices;

a second connector connectable to a second power line of the plurality of power lines;

a power converter configured to convert power input from one of the first connector and the second connector and output converted power from the other of the first connector and the second connector; and a controller configured to select a master device from power electronics devices connected to one of a plurality of power lines including the first power line and the second power line, based on power conversion characteristic information of the power electronics devices, the master device controlling other power electronics devices, regarding input/output power from/to the one of the plurality of power lines, by transmitting control commands thereto;

at least one power device being capable of discharge power; and a plurality of power lines configured to interconnect the power electronics devices and the at least one power device, wherein:

one of the power electronics devices are configured to receive a control instruction related to power discharge, from the higher-order control device; and the power electronics devices are configured to perform a coordinated operation based on the control instruction, wherein the controller is configured to, when one of the power electronics devices has a conversion function from alternating current to direct current (AC/DC) and a remainder of the power electronics devices has a conversion function from direct current to direct current (DC/DC), select, as the master device, the one of the power electronics devices, and the controller is configured to, when two or more of the power electronics devices have a conversion function from alternating current to direct current (AC/DC), select the master device based on a number of lower-order power electronics devices under each of the two or more power electronics devices in a case that numbers of lower-order power electronics devices under the two or more power electronics devices are different from each other.

* * * * *